US011132328B2

(12) United States Patent
Lowery et al.

(10) Patent No.: US 11,132,328 B2
(45) Date of Patent: Sep. 28, 2021

(54) HIGH LEVEL INSTRUCTIONS WITH LOWER-LEVEL ASSEMBLY CODE STYLE PRIMITIVES WITHIN A MEMORY APPLIANCE FOR ACCESSING MEMORY

(71) Applicant: Rambus Inc., Sunnyvale, CA (US)

(72) Inventors: Keith Lowery, Garland, TX (US); Vlad Fruchter, Los Altos, CA (US)

(73) Assignee: RAMBUS, INC., San Jose, CA (US)

( * ) Notice: Subject to any disclaimer, the term of this patent is extended or adjusted under 35 U.S.C. 154(b) by 157 days.

(21) Appl. No.: 14/539,740

(22) Filed: Nov. 12, 2014

(65) Prior Publication Data

US 2015/0178243 A1 Jun. 25, 2015

Related U.S. Application Data

(60) Provisional application No. 61/919,318, filed on Dec. 20, 2013, provisional application No. 61/952,784,
(Continued)

(51) Int. Cl.
*G06F 15/167* (2006.01)
*G06F 15/173* (2006.01)
(Continued)

(52) U.S. Cl.
CPC ...... *G06F 15/17331* (2013.01); *G06F 3/0619* (2013.01); *G06F 12/0653* (2013.01);
(Continued)

(58) Field of Classification Search
CPC .. G06F 13/28; G06F 15/17331; G06F 3/0608; G06F 3/0619; G06F 11/2043;
(Continued)

(56) References Cited

U.S. PATENT DOCUMENTS

| 6,295,571 B1 | 9/2001 | Scardamalia et al. |
| 6,467,011 B2 | 10/2002 | Scardamalia et al. |

(Continued)

FOREIGN PATENT DOCUMENTS

| CN | 1195814 A | 10/1998 |
| CN | 101069391 A | 11/2007 |

(Continued)

OTHER PUBLICATIONS

PCT International Search Report and Written Opinion dated Apr. 7, 2015 in International Application No. PCT/US2014/071732. 22 pages.

(Continued)

*Primary Examiner* — Anh Nguyen
(74) *Attorney, Agent, or Firm* — Lowenstein Sandler LLP

(57) ABSTRACT

A method of processing memory instructions including receiving a memory related command from a client system in communication with a memory appliance via a communication protocol, wherein the memory appliance comprises a processor, a memory unit controller and a plurality of memory devices coupled to said memory unit controller. The memory related command is translated by the processor into a plurality of commands that are formatted to perform prescribed data manipulation operations on data of the plurality of memory devices stored in data structures. The plurality of primitive commands is executed on data stored in the memory devices to produce a result, wherein the executing is performed by the memory unit controller. A direct memory transfer of the result is established over the communication protocol to a network.

24 Claims, 20 Drawing Sheets

Related U.S. Application Data filed on Mar. 13, 2014, provisional application No. 61/952,800, filed on Mar. 13, 2014, provisional application No. 61/952,798, filed on Mar. 13, 2014, provisional application No. 61/952,778, filed on Mar. 13, 2014, provisional application No. 61/952,796, filed on Mar. 13, 2014, provisional application No. 61/990,009, filed on May 7, 2014, provisional application No. 61/990,014, filed on May 7, 2014, provisional application No. 61/990,033, filed on May 7, 2014.

(51) Int. Cl.
  *G06F 12/06* (2006.01)
  *G06F 3/06* (2006.01)
  *G06F 13/16* (2006.01)
  *H04L 29/08* (2006.01)

(52) U.S. Cl.
  CPC .......... *G06F 12/0692* (2013.01); *G06F 13/16* (2013.01); *H04L 67/1097* (2013.01); *H04L 67/2842* (2013.01)

(58) Field of Classification Search
  CPC .... G06F 15/167; G06F 12/1072; G06F 12/14; G06F 3/067; G06F 3/0629; G06F 3/0689; G06F 12/0653; G06F 12/0692; G06F 13/16; H04L 49/103; H04L 67/2842; H04L 41/32; H04L 69/16; H04L 67/1097
  USPC ........................................................ 709/212
  See application file for complete search history.

(56) References Cited

U.S. PATENT DOCUMENTS

| | | | |
|---|---|---|---|
| 6,892,298 | B2 | 5/2005 | West |
| 6,970,891 | B1 | 11/2005 | Deo et al. |
| 7,171,494 | B2 | 1/2007 | Karamanolis et al. |
| 7,490,211 | B2 | 2/2009 | Schnepper |
| 8,364,867 | B2 | 1/2013 | Karamcheti et al. |
| 8,924,661 | B1 * | 12/2014 | Shachar .............. G06F 13/1668 365/189.2 |
| 9,501,431 | B1 * | 11/2016 | Laredo ................... G06F 13/16 |
| 2004/0220939 | A1 | 11/2004 | Miller et al. |
| 2005/0066136 | A1 | 3/2005 | Schnepper |
| 2005/0268049 | A1 | 12/2005 | De Lange |
| 2005/0286506 | A1 * | 12/2005 | LaBerge .............. G06F 13/1684 370/363 |
| 2006/0052964 | A1 * | 3/2006 | Sugaya ............. G01R 31/3192 702/117 |
| 2006/0156074 | A1 | 7/2006 | Kumar |
| 2006/0168436 | A1 | 7/2006 | Campbell |
| 2007/0079161 | A1 * | 4/2007 | Gupta ................... G06F 1/3203 713/324 |
| 2007/0192530 | A1 * | 8/2007 | Pedersen ............. G06F 12/0246 711/103 |
| 2008/0082488 | A1 | 4/2008 | Terrell |
| 2008/0162866 | A1 | 7/2008 | Siddiqi et al. |
| 2009/0172276 | A1 * | 7/2009 | Nochimowski ....... G06F 3/0607 711/114 |
| 2009/0271412 | A1 | 10/2009 | Lacapra et al. |
| 2009/0292861 | A1 | 11/2009 | Kanevsky et al. |
| 2010/0110748 | A1 * | 5/2010 | Best .................... G06F 12/0638 365/51 |
| 2010/0198936 | A1 * | 8/2010 | Burchard ............ G06F 13/1673 709/212 |
| 2010/0235602 | A1 | 9/2010 | Chan |
| 2011/0075740 | A1 | 3/2011 | Ferraiolo et al. |
| 2011/0145493 | A1 | 6/2011 | Ahn et al. |
| 2012/0042204 | A1 | 2/2012 | Smith et al. |
| 2012/0106228 | A1 | 5/2012 | Lee |
| 2012/0110242 | A1 | 5/2012 | Tsai et al. |
| 2012/0203999 | A1 | 8/2012 | Jess |
| 2012/0204079 | A1 | 8/2012 | Takefman et al. |
| 2012/0206165 | A1 * | 8/2012 | Ferolito .............. G06F 13/4086 326/30 |
| 2012/0268982 | A1 | 10/2012 | Rajan |
| 2012/0311231 | A1 * | 12/2012 | Porterfield ............ G11C 16/06 711/103 |
| 2013/0036314 | A1 | 2/2013 | Glew et al. |
| 2013/0042056 | A1 | 2/2013 | Shats et al. |
| 2013/0073802 | A1 | 3/2013 | Haywood |
| 2013/0117503 | A1 | 5/2013 | Nellans et al. |
| 2013/0198434 | A1 * | 8/2013 | Mylly ................. G06F 12/0246 711/103 |
| 2013/0226971 | A1 * | 8/2013 | Shoolman ......... G06F 17/30575 707/790 |
| 2014/0068184 | A1 | 3/2014 | Edwards et al. |
| 2014/0074969 | A1 | 3/2014 | Kadayam et al. |
| 2014/0119615 | A1 | 5/2014 | Mercolino et al. |
| 2014/0164677 | A1 * | 6/2014 | Borchers ............... G06F 3/0611 711/103 |
| 2014/0181453 | A1 * | 6/2014 | Jayasena ............. G06F 13/1694 711/170 |
| 2014/0223100 | A1 | 8/2014 | Chen |
| 2015/0160862 | A1 | 6/2015 | Blott et al. |
| 2015/0178243 | A1 | 6/2015 | Lowery |
| 2016/0170788 | A1 | 6/2016 | Tarasuk-Levin et al. |
| 2016/0364347 | A1 | 12/2016 | Yeung |

FOREIGN PATENT DOCUMENTS

| | | |
|---|---|---|
| CN | 101211313 A | 7/2008 |
| CN | 102591783 A | 7/2012 |
| EP | 0644548 A2 | 3/1995 |
| EP | 0593100 B1 | 1/2003 |
| EP | 1864221 B1 | 5/2010 |
| WO | WO-2000-057286 A1 | 9/2000 |
| WO | WO-2010-016889 A2 | 2/2010 |
| WO | WO-2012-104847 A1 | 8/2012 |

OTHER PUBLICATIONS

Notification Concerning Transmittal of International Preliminary Report on Patentability dated Jun. 30, 2016 re: Int'l Appln. No. PCT/US2014/071732. 19 Pages.

Blott et al., "Achieving 10Gbps Line-Rate Key-Value Stores with FPGAs," Proceedings of the 5th USENIX Workshop on Hot Topics in Cloud Computing, Jun. 2013, pp. 1-6. 6 pages.

Blott, Michaela, "Dataflow Architectures for 10Gbps Line-rate Key-Value-Stores," Xilinx Research, 2013, pp. 1-25. 25 pages.

Cheriton et al., "HICAMP: Architectural Support for Efficient Concurrency-Safe Shared Structured Data Access," Proceedings of the 17th International Conference on Architectural Support for Programming Languages and Operating Systems, ASPLOS'12, Mar. 3-7, 2012, London, England, pp. 287-299. 13 pages.

Huawei Technologies Co., Ltd., "High Throughput Computing Data Center Architecture," Technical White Paper, Jun. 2014. 8 pages.

IBM, "IBM System x3750 M4 Virtual Large Memory Appliance," IBM Data Sheet, 2013. 2 pages.

Kove, "About Xpress Disk (xpd)," Kove Corporation Data Sheet, 2013. 2 pages.

Lim, Kevin Te-Ming, "Disaggregated Memory Architectures for Blade Servers," dissertation for Doctor of Philosophy (Computer Science and Engineering), University of Michigan, 2010. 148 pages.

Lim, Kevin Te-Ming, "Disaggregated Memory Architectures for Blade Servers," dissertation submitted to University of Michigan, 2010. 153 pages.

Lim, Kevin, "Disaggregated Memory for Expansion and Sharing in Blade Servers," Proceedings of the 36th Annual International Symposium on Computer Architecture, Jun. 20-24, 2009, Austin, TX, pp. 1-12. 12 pages.

Pandey et al., "DMA-Aware Memory Energy Management," The 12th International Symposium on High-Performance Computer Architecture, HPCA '06, pp. 133-144, Feb. 11-15, 2006. 12 pages.

(56) References Cited

OTHER PUBLICATIONS

Yoo et al., "Phoenix Rebirth: Scalable Mapreduce on a NUMA System," Proceedings on the International Symposium on Workload Characterization (IISWC), 2009, pp. 1-10. 10 pages.
EP Extended European Search Report dated Jul. 21, 2017 re: EP Appln. No. 14872200.2. 8 Pages.
USPTO, Advisory Action for U.S. Appl. No. 14/539,740 dated Jun. 1, 2017. 4 Pages.
USPTO, Final Office Action for U.S. Appl. No. 14/539,628 dated Oct. 26, 2016. 11 Pages.
USPTO, Final Office Action for U.S. Appl. No. 14/539,662 dated Oct. 26, 2016. 19 Pages.
USPTO, Final Office Action for U.S. Appl. No. 14/539,740 dated Mar. 21, 2017. 18 Pages.
USPTO, Notice of Allowance for U.S. Appl. No. 14/539,662 dated Feb. 1, 2017. 7 Pages.
USPTO, Office Action for U.S. Appl. No. 14/539,628 dated Apr. 19, 2017. 12 Pages.
USPTO, Office Action for U.S. Appl. No. 14/539,628 dated May 24, 2016. 10 Pages.
USPTO, Office Action for U.S. Appl. No. 14/539,662 dated May 26, 2016. 18 Pages.
USPTO, Office Action for U.S. Appl. No. 14/539,740 dated Nov. 21, 2016. 16 Pages.
CN Office Action dated Aug. 1, 2018 re: CN Appln. No. 201480069497.0. 17 Pages. (With Translation).
EP Response Filed on Jan. 23, 2018 in Response to the Official Communication dated Aug. 8, 2017 and the European Search Report dated Jul. 21, 2017 re: EP Appln. No. 14872200.2. 20 Pages.
CN Office Action dated Sep. 27, 2019 re: CN Appln. No. 201480069497.0. 6 Pages. (W/Translation).

\* cited by examiner

500

510
RECEIVING A COMMAND AT A HOST CONTROLLER OF A MEMORY APPLIANCE SYSTEM, WHEREIN THE HOST CONTROLLER MANAGES DATA ACROSS ONE OR MORE OF A PLURALITY OF SMART MEMORY CUBES (SMCS) COMMUNICATIVELY COUPLED TOGETHER THROUGH A NETWORK, WHEREIN EACH SMC COMPRISES MEMORY AND A PROGRAMMABLE SMC MEMORY CONTROLLER FOR MANAGING DATA WITHIN THE MEMORY, WHEREIN THE COMMAND IS DIRECTED TO A FIRST PROGRAMMABLE SMC MEMORY CONTROLLER

520
DETERMINING A FUNCTION TYPE CORRESPONDING FOR THE COMMAND, WHEREIN THE FUNCTION TYPE IS ASSOCIATED WITH A FIRST CONFIGURATION FILE, WHEREIN THE FIRST CONFIGURATION FILE IS USED TO RECONFIGURE THE FIRST PROGRAMMABLE SMC MEMORY CONTROLLER IN ORDER TO EXECUTE THE COMMAND

FIG. 5

HIGH LEVEL INSTRUCTIONS WITH LOWER-LEVEL ASSEMBLY CODE STYLE PRIMITIVES WITHIN A MEMORY APPLIANCE FOR ACCESSING MEMORY

CROSS REFERENCE TO RELATED APPLICATIONS

The present application claims priority to and the benefit of the commonly owned, provisional patent application, U.S. Ser. No. 61/919,318, entitled "HIGH DENSITY RACK-MOUNT MEMORY WITH PROCESSING CAPABILITY," with filing date Dec. 20, 2013, and having attorney docket number 765-0083P (10154US01), which is herein incorporated by reference in its entirety. The present application claims priority to and the benefit of the commonly owned, provisional patent application, U.S. Ser. No. 61/952,784, entitled "A MEMORY APPLIANCE SYSTEM AND ARCHITECTURE INCLUDING ONE OR MORE PROGRAMMABLE INTERFACES FOR ACCESSING MEMORY," with filing date Mar. 13, 2014, and having attorney docket number RMBS-0001-00.00US, which is herein incorporated by reference in its entirety. The present application claims priority to and the benefit of the commonly owned, provisional patent application, U.S. Ser. No. 61/952,800, entitled "METHOD AND SYSTEM FOR APPLICATION AWARE ACCELERATION OF PROGRAMMABLE MEMORY INTERFACES FOR ACCESSING MEMORY IN A MEMORY APPLIANCE ARCHITECTURE," with filing date Mar. 13, 2014, and having attorney docket number RMBS-0002-00.00US, which is herein incorporated by reference in its entirety. The present application claims priority to and the benefit of the commonly owned, provisional patent application, U.S. Ser. No. 61/952,798, entitled "RELIABILITY, AVAILABILITY, AND SERVICEABILITY (RAS) WITHIN A MEMORY APPLIANCE ARCHITECTURE INCLUDING ONE OR MORE PROGRAMMABLE INTERFACES FOR ACCESSING MEMORY," with filing date Mar. 13, 2014, and having attorney docket number RMBS-0003-00.00US, which is herein incorporated by reference in its entirety. The present application claims priority to and the benefit of the commonly owned, provisional patent application, U.S. Ser. No. 61/952,778, entitled "REDUCING LATENCY WITHIN A MEMORY APPLIANCE ARCHITECTURE INCLUDING ONE OR MORE PROGRAMMABLE INTERFACES FOR ACCESSING MEMORY," with filing date Mar. 13, 2014, and having attorney docket number RMBS-0004-00.00US, which is herein incorporated by reference in its entirety. The present application claims priority to and the benefit of the commonly owned, provisional patent application, U.S. Ser. No. 61/952,796, entitled "BLOB POOLS AND SELECTORS, LEVERAGING VERTICAL INTEGRATION, CREATING SUSTAINABLE ADVANTAGE, AND OXFORD COMMAND SET," with filing date Mar. 13, 2014, and having attorney docket number RMBS-0005-00.00US, which is herein incorporated by reference in its entirety. The present application claims priority to and the benefit of the commonly owned, provisional patent application, U.S. Ser. No. 61/990,009, entitled "HIGH LEVEL INSTRUCTIONS WITH LOWER-LEVEL ASSEMBLY CODE STYLE PRIMITIVES WITHIN A MEMORY APPLIANCE ARCHITECTURE INCLUDING ONE OR MORE PROGRAMMABLE INTERFACES FOR ACCESSING MEMORY," with filing date May 7, 2014, and having attorney docket number RMBS-0007-00.00US, which is herein incorporated by reference in its entirety. The present application claims priority to and the benefit of the commonly owned, provisional patent application, U.S. Ser. No. 61/990,014, entitled "MEMORY APPLIANCE ARCHITECTURE INCLUDING ONE OR MORE PROGRAMMABLE INTERFACES (E.G., FPGAS) FOR ACCESSING MEMORY," with filing date May 7, 2014, and having attorney docket number RMBS-0008-00.00US, which is herein incorporated by reference in its entirety. The present application claims priority to and the benefit of the commonly owned, provisional patent application, U.S. Ser. No. 61/990,033, entitled "ARCHITECTURE OF A MEMORY PACKET INCLUDING DATA STRUCTURE AND HIERARCHY USED WITHIN A MEMORY APPLIANCE ARCHITECTURE INCLUDING ONE OR MORE PROGRAMMABLE INTERFACES FOR ACCESSING MEMORY," with filing date May 7, 2014, and having attorney docket number RMBS-0009-00.00US, which is herein incorporated by reference in its entirety.

This application is related to commonly owned, U.S. patent application Ser. No. 14/539,641 entitled "A MEMORY APPLIANCE FOR ACCESSING MEMORY," with filing date Nov. 12, 2014 This application is related to U.S. patent application Ser. No. 14/539,628, entitled "A MEMORY PACKET, DATA STRUCTURE AND HIERARCHY WITHIN A MEMORY APPLIANCE FOR ACCESSING MEMORY," with filing date Nov. 12, 2014. This application is related to U.S. patent application Ser. No. 14/539,662, entitled "BLOB POOLS, SELECTORS, AND COMMAND SET IMPLEMENTED WITHIN A MEMORY APPLIANCE FOR ACCESSING MEMORY," with filing date Nov. 12, 2014.

BACKGROUND

Increasingly, information is stored in large data storage systems. At a base level, these data storage systems are configured with multiple processors, each controlling access to corresponding memory. Each processor is configured to control a certain amount of memory. However, scaling of memory by adding processors with corresponding memory is unable to keep current with demands to increase memory capacity due to processor cost constraints and limited increases in memory per processor.

ACRONYMS, ABBREVIATIONS, & TERMS

MA—memory appliance
NPU—network processing unit
SMC—Smart Memory Cube
OCP—open compute project
FPGA—field programmable gate array
KV—key/value
AXI—Advanced eXtensible Interface
RegEx or regexp—regular expression
QoS—quality of service
FF—form factor
PDU—power distribution unit
PS—power supply
POR—plan of record
RAS—reliability, availability, and serviceability
MC—memory controller
HW or H/W—hardware
SW—software
DMA—direct memory access
CRC—cyclic redundancy check
Rd or RD—read
Wr or WR—write FIFO—first-in first-out
PHY—physical layer
IO or I/O—input/output
ASIC—application specific integrated circuit
DIMM—dual in-line memory module
LRDIMM—load reduced DIMM
CPU—central processing unit
CA or C/A—command/address
ECC—error correcting code
DDR—double data rate
Addr—address
RAM—random access memory
DRAM—dynamic random access memory
RDIMM—registered DIMM
B/W—bandwidth
OS—operating system
GPU—graphics processing unit
NVM—nonvolatile memory
SSD—solid state disk
DFS—distributed file system
IOPS—I/Os per second
PCB—printed circuit board
IP—internet protocol
NIC—network interface card
PCI—peripheral component interconnect
PCIe—peripheral component interconnect express
OSI—Open Systems Interconnection
TCP—transmission control protocol
UDP—user datagram protocol
EEPROM—electrically erasable programmable read-only memory
DPA—differential power analysis
PCQ—physical command queue
CCD—command control or copy daemon
RET—the last command in a chain
ROM—read only memory
CD-ROM—compact disc ROM
DVD—digital versatile disk
RF—radio frequency
ISA—Industry Standard Architecture
SCSI—Small Computer System Interface
USB—universal serial bus
WAN—wide area network
LAN—local area network
PAN—personal area network
NAS—network attached storage
NFS—network file system
SMB—server message block
CIFS—common internet file system
SAN—storage area network

BRIEF DESCRIPTION OF THE DRAWINGS

Further aspects of the present disclosure will become apparent from the following description which is given by way of example only and with reference to the accompanying drawings in which:

FIG. 5 is a flow diagram illustrating a method for a memory appliance implementing application aware acceleration within a corresponding SMC, in accordance with one embodiment of the present disclosure.

DETAILED DESCRIPTION

Reference will now be made in detail to the various embodiments of the present disclosure, examples of which are illustrated in the accompanying drawings. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Memory Appliance System

Figure 1A:
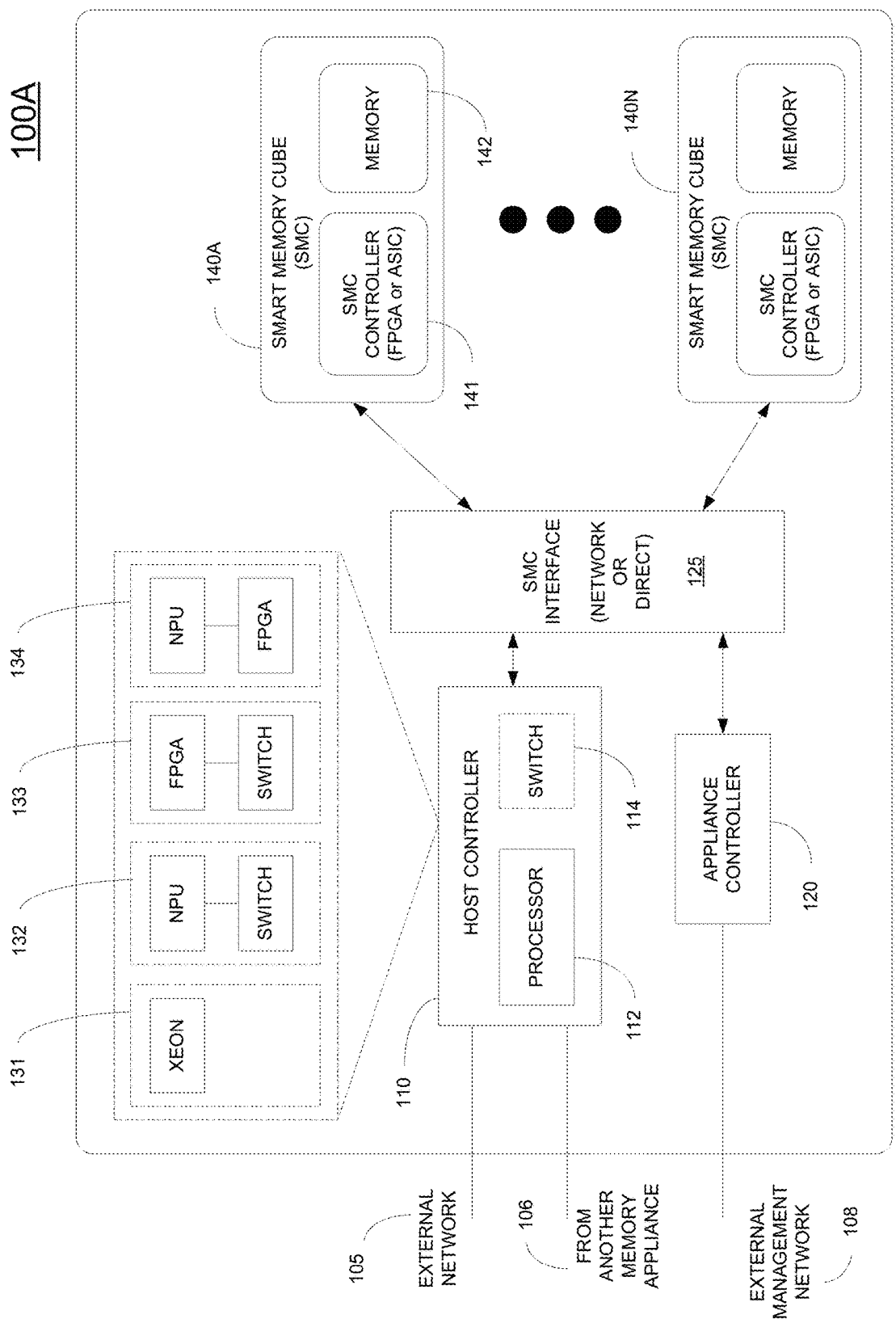
FIG. 1A is a block diagram of a memory appliance including a SMC including SMC controllers implemented as FPGAs and/or ASICs, in accordance with one embodiment of the present disclosure.

FIG. 1A is a block diagram of a memory appliance system 100A, in accordance with one embodiment of the present disclosure. In one embodiment, the memory appliance system 100A provides for higher capacity and higher bandwidth scaling of memory and computation offloading to the memory with the use of programmable memory interfaces between network interface 125 and SMCs 140A-N. In another embodiment, the memory appliance system 100A provides for a higher rate of scaling of memory with the use of hardware implemented ASICs memory interfaces. Both the programmable and ASIC implementable memory interfaces on the memory side of an interface are configured to control and perform application specific primitive operations on memory that are typically controlled by a processor on the other side of the interface. Memory appliance system 100A is configured to receive high level command or instructions (e.g., OSI layer 7 protocol or interface command from a client system), and to translate the instructions into lower-level assembly code style primitive operations that are executable by a plurality of SMC controllers. By controlling and performing these primitive operations at the memory, data from each primitive operation need not be delivered back-and-forth over the interface, thereby greatly reducing and/or avoiding the latency buildup normally experienced with increased scaling of memory.

The memory appliance 100A includes a plurality of smart memory units or Smart Memory Cubes (SMCs) 140A-N, each of which includes memory. The term "SMCs" is used throughout this disclosure for ease of reference but is not meant to impart a special definition or suggest that particular functions or aspects are required. As such, memory is distributed throughout the memory appliance 100A in the plurality of SMCs 140A-N. The memory appliance 100A can be configured as a stand-alone unit, or as a scalable unit. That is, in a scalable configuration a plurality of similarly configured memory appliances may be combined to form a non-limited and scalable configuration of memory.

In either the stand-alone or scalable configurations, an appliance controller 120 is coupled to the plurality of SMCs 140A-N through a command interface in order to provide configuration information for memory contained within the SMCs 140A-N. The appliance controller 120 may be coupled to higher level controller that remotely manages one or more memory appliances through an external management network 108. For example, operations performed by the appliance controller 120 alone or in cooperation with a remote manager include discovery of memory, provision of memory (e.g., within a virtual memory device), event logging, remote management, power and/or thermal management, monitor, and control.

As shown in FIG. 1A, the memory appliance system includes a host controller 110 that is configured to perform processing and switching operations. More particularly, host controller 110 manages memory distributed throughout the plurality of SMCs 140A-N in the memory appliance system 100A. Additionally, the host controller 110 is operable to be coupled to one or more communication channels with a command interface, wherein the communication channels are coupled over an interface 125 to memory. Also some form of notification (e.g., pointers to memory) or results is also delivered through the interface 125 back to the host controller 110.

The host controller 110 includes a processor 112 and an optional switch 114, in one implementation. The processor 112 generates and communicates commands over the one or more communication channels, wherein the commands are configured for accessing memory distributed throughout a plurality of SMCs. For example, the processor 112 is configured to receive high level commands (e.g., from a client side database application implementing Memecached) and translate those commands to a series of primitive commands that are operable within each of the SMCs for accessing and/or operating on data stored in memory. In addition, the switch 114 is configurable to deliver a corresponding command or series of commands to the proper SMC for accessing and/or performing operations on memory.

The processor 112 in the host controller 110 is configured to receive and send communications over an external network 105. In one example, the external network provides an interface with a client device. In another example, an external network 106 is configured provide communications between memory appliances. In one embodiment, the external networks 105 and 106 are similarly configured. In one embodiment, the processor 112 is coupled to a NIC to provide access to the external network. In another embodiment, the processor 112 is configured as a NPU that includes an internal communication interface for communicating with the external network. In still another embodiment, the processor 112 is configured as an FPGA.

Various configurations are supported for the host controller. For illustration purposes only, as shown in FIG. 1A, a first configuration 131 includes a CPU (e.g., an Intel XEON® processor); a second configuration 132 includes an NPU configured for performing processing operations, and a switch for performing switching operations; a third configuration 133 includes an FPGA configured for performing processing operations, and a switch for performing switching operations; and a fourth configuration 134 includes an NPU configured for performing processing operations, and an FPGA configured for performing switching operations. Other configurations are supported, such as an Intel XEON® processor and a switch for performing switching operations.

Figure 1B:
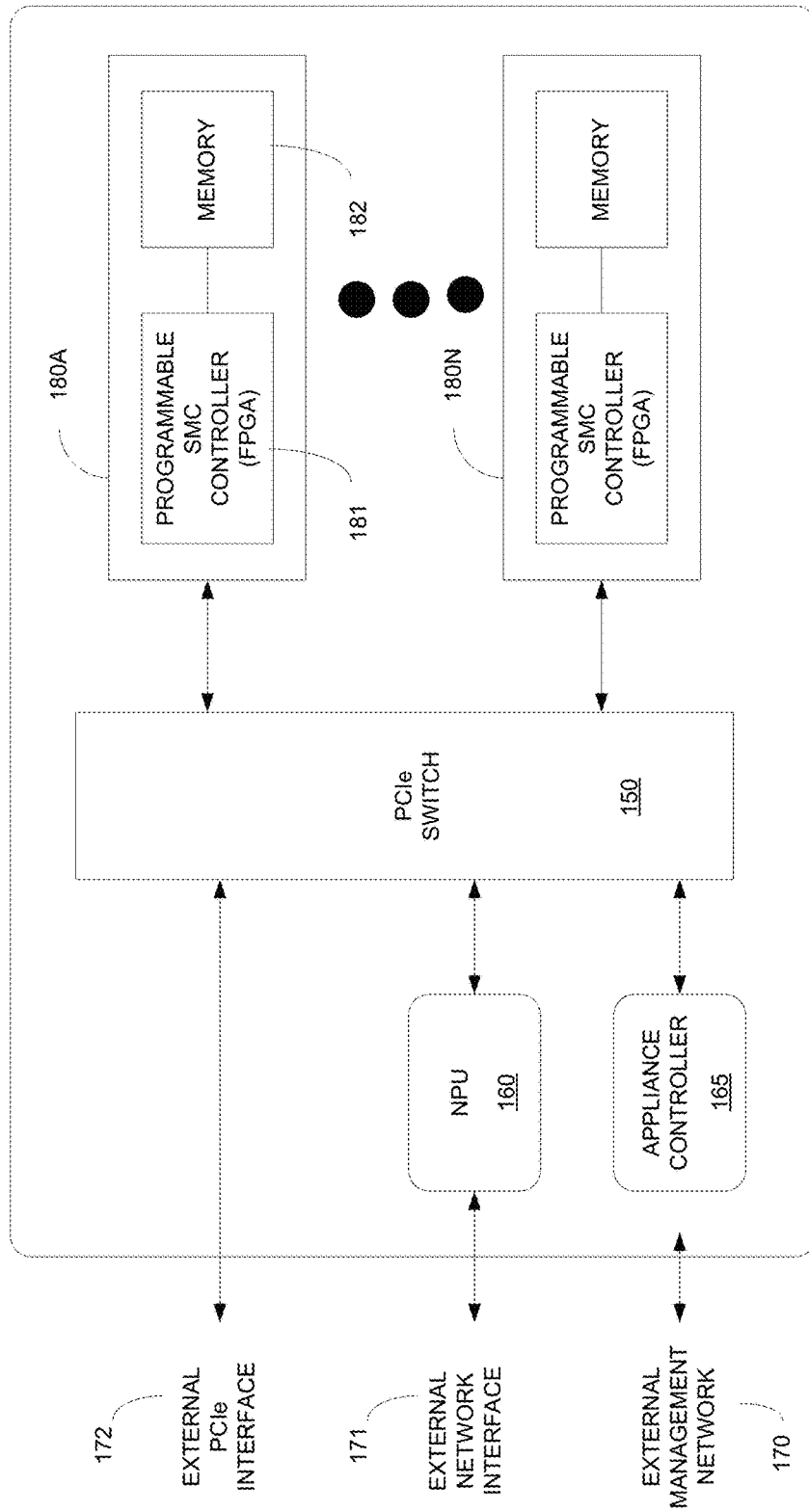
FIG. 1B is a block diagram of a memory appliance including a NPU as a host controller that communicates with a plurality of SMCs over a PCIe interface, in accordance with one embodiment of the present disclosure.

A specific configuration including an NPU as a host controller is further described in FIG. 1B, in accordance with one embodiment of the present disclosure. Specifically, the memory appliance 100B includes a plurality of SMCs 180A-N, each of which include memory. An appliance controller 165 is coupled to the plurality of SMCs 180A-N through an interface that is a PCIe switch 150 to provide configuration information to the memory. In one implementation, the appliance controller 165 is coupled to a higher level controller through the external management network 170 for remote management. In addition, the memory appliance system 100B includes a host controller that is an NPU 160, and is configured for managing memory distributed throughout the plurality of SMCs 180A-N. Each of the SMCs includes a programmable SMC controller (e.g., FPGA) 181 and memory 182. Communication between the NPU 160 and the plurality of SMCs 180A-N is achieved through the PCIe switch 150. As such, commands generated by the NPU 160 and configured to access and operate on memory in the SMCs 180A-N is delivered through the PCIe switch 150 for operation by the corresponding programmable SCM controller. Also some form of notification or results is also delivered through the PCIe switch 150 back to the NPU 160.

Returning to FIG. 1A, as previously presented, the processor 112 is configured to manage memory throughout the plurality of SMCs in the memory appliance system when performing host controller duties. For example, the processor 112 in the host controller 110 is configured to provide memory services, such as, load balancing, quality of service, connection management, and traffic routing. Further, in one embodiment, the host controller 110 manages memory in the memory appliance system as a virtual memory system.

The plurality of SMCs 140A-N is coupled to the processor 112 through one or more communication channels established through a command interface 125, also referred to as the SMC interface 125. In that manner, commands generated by or passed through the processor 112 are delivered to the plurality of SMCs 140A-N through the command interface 125.

In one embodiment, the communication channels in the command interface 125 comprises a network interface for providing communication between the host controller 110 and the plurality of SMCs 140A-N. That is, communication between the processor and the plurality of SMCs is accomplished using networking protocols. For instance, the network interface may be configured using one of the following protocols: a TCP; a UDP; Ethernet; Infiniband; Fiber Channel, and other networking protocols.

In another embodiment, the communication channels in the command interface 125 comprise a direct interface. That is, the processor 112 and each of the plurality of SMCs communicate over a point-to-point communication channel or link between two ports. For example, the link may establish a point-to-point communication using the PCIe interface, or one of its derivatives, that is a high-speed serial computer expansion bus standard.

Each SMC includes a brick or unit controller (also referred to as the SMC controller) that is hardwired or programmable to execute application specific commands and/or operations generated by an external client and/or application. For illustration, SMC 140A, including its components, is representative of each of the plurality of SMCs 140A-N. For example, SMC controller 141 is configured to perform data operations on the content that is included in memory 142. In one embodiment, the data operations are performed transparently to the command interface and/or requesting client (communicatively coupled through the external network 105). That is, once a high level command or instruction is delivered over the command interface from the requesting client, control over execution of the primitive data operations based on the high level command is handed over to the SMC controller 141. For example, data operations include search, sort, and other custom accelerations.

In one embodiment, the SMC controller 141 in SMC 140A is configured as a FPGA that is pre-programmed with the proper functionality to handle a requested command. In another embodiment, the FPGA is programmed on-the-fly depending on the request made on the memory 142 contained within SMC 140A. For example, the FPGA is configured to generate and compile primitive operations when receiving one or more high level commands, wherein the primitive operations are executable by the FPGA. In another embodiment, the FPGA is configured to access configuration files for programming with the proper functionality. In still another embodiment, the SMC controller 141 is implemented through an ASIC device providing application specific operations.

In embodiments, the SMC controller 141 is configured to respond to primitive commands delivered over the command/SMC interface 125 to access and/or perform operations on content stored in memory 142. More specifically, processor 112 is configured to receive high level commands over the external network 105 (e.g., from a client application) and translate each of the commands to one or more primitive operations. The primitive operations are delivered over the command/SMC interface 125 for handling by the SMC controller 141. In that manner, by handling these primitive operations at the memory, the step by step control of the primitive operations associated with a particular high level command need not be controlled by processor 112, thereby reducing and/or avoiding any latency due to increased scaling of memory in the plurality of SMCs 140A-N.

For example, the plurality of memory devices in memory appliance 100A may be configured as a Memecached memory system that is a general-purpose distributed memory caching system. As such, the primitive commands are designed to implement access and manipulation of data within the Memecached memory system. In particular, access to memory in the Memecached memory system is performed using a key value pair or key value functions as implemented through the primitive operations. For example, using one or more primitive operations, a key within a command is hashed using the appropriate algorithm in order to determine proper addressing within the memory. Typical key value commands/functions include "GET" and "SET" and "DELETE" operations that are each further translated into one or more primitive operations handled by the corresponding SMC.

Further, in one embodiment the SMC controller 141 in SMC 140A is configured to respond to high level commands delivered over the command/SMC interface 125 to access and/or perform operations on content stored in memory 142. That is, the SMC controller 141 can be configured to translate the high level commands into a format suitable for use within the SMC controller 141 when interfacing with memory 142. That is, instead of performing translation at processor 112, the translation of high level commands into primitive operations suitable for use within the SMC controller 141 is performed locally.

In one embodiment, SMC controller 141 is configured to provide custom acceleration of data operations. Some examples of custom accelerations include, but is not limited to, error recovery, data manipulation, and data compression. For example, SMC controller 141 may be configured to handle one or more application specific operations (e.g., Memecached search operation). In one embodiment, SMC controller 141 is programmable such as through an FPGA to handle a specific operation. In another embodiment, SMC controller 141 is programmed on-the-fly to handle an incoming operation. In still another embodiment, SMC controller is implemented through an ASIC that is configured to handle one or more application specific operations.

Further, the SMC controller 141 may include an additional processor for handling less time sensitive functions, such as, management and control of the memory devices. For instance, instructions coming from the appliance controller 120 are handled by this additional processor (e.g., SMC micro-controller described in FIG. 4).

In addition, each SMC includes a plurality of memory devices. For example, SMC 140A includes memory 142. In one embodiment, the plurality of memory devices in a corresponding SMC includes memory devices packaged in a DIMM, registered memory module (RDIMM), and/or load reduced memory (LRDIMM). In one further embodiment, the memory devices packaged in a corresponding DIMM include DRAM memory devices. In another embodiment, the memory devices packaged in a corresponding DIMM include non-volatile read/write memory (e.g., FLASH) In still another embodiment, the memory devices packaged in a corresponding DIMM include non-volatile memory devices (e.g., FLASH, EEPROM).

In one embodiment, each SMC is configured with multiple channels (e.g., four), each of which is suitable for handling multiple DIMMs (e.g., six). In an example, SMC 140A is able to handle up to and more than twenty-four DIMMs given four channels, and six DIMMs per channel. As demonstrated, embodiments of the present disclosure provide for a larger amount of DIMMs per SMC for increased scalability.

Figure 2:
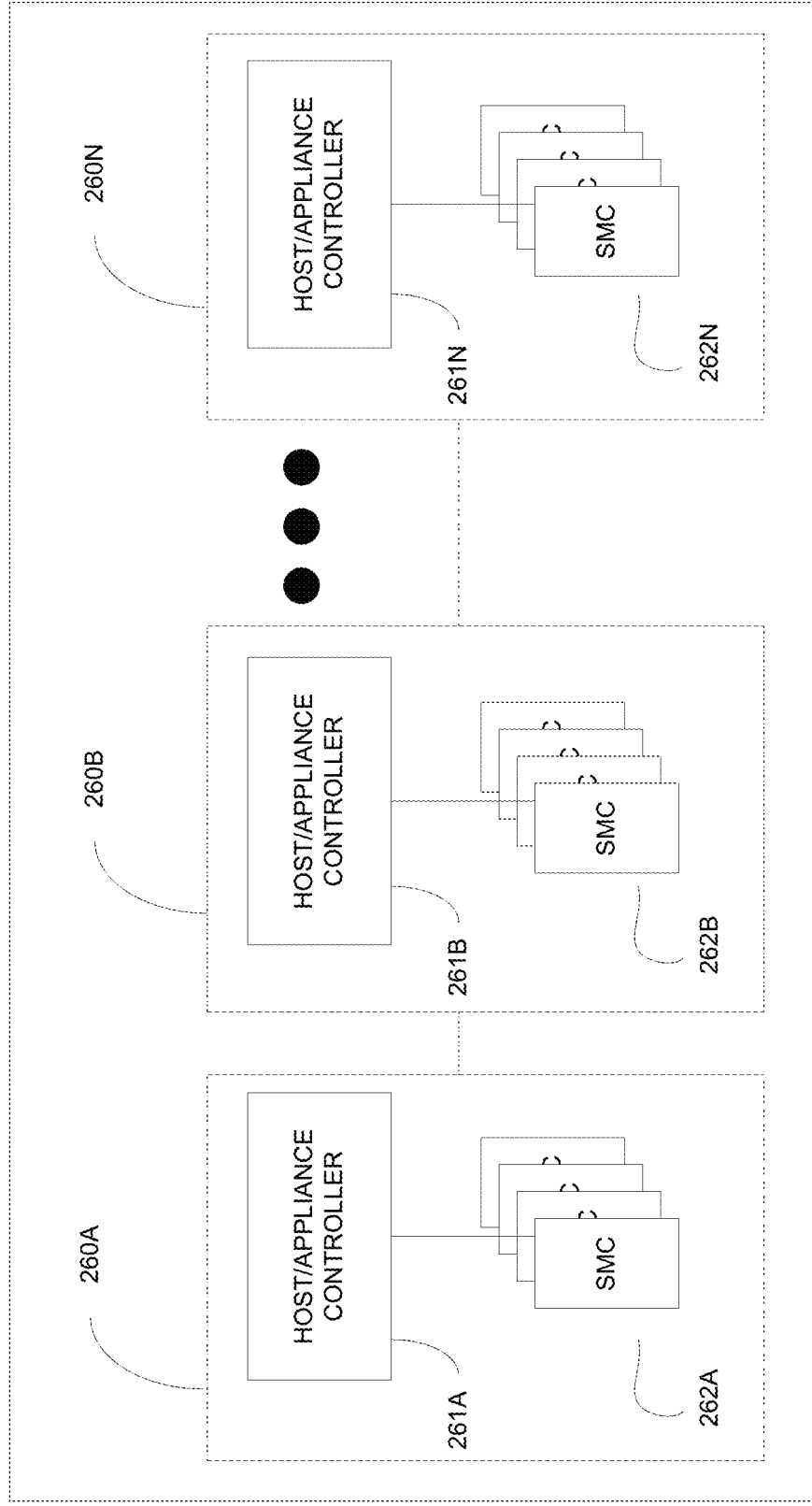
FIG. 2 is a block diagram of a plurality of memory appliances, in accordance with one embodiment of the present disclosure.

FIG. 2 is a block diagram of a memory system 200 including plurality of memory appliances 260A-N, in accordance with one embodiment of the present disclosure. The plurality of memory appliances 260A-N provide access to internal memory devices. That is, each of the memory appliances 260A-N provides access to corresponding memory. In particular, the plurality of memory appliances 260A-N includes a first memory appliance system (e.g., 260A) and at least one other, or second, memory appliance system (e.g., 260B). Both memory appliance systems are similarly configured, such as, that described in FIGS. 1A-B. For example, each of the memory appliance systems include a host controller for managing data across a corresponding plurality of SMCs.

For illustration, memory appliance 260A provides access to memory 262A through host controller 261A, wherein memory 262A includes one or more SMCs; memory appliance 260B provides access to memory 262B through host controller 261B, wherein memory 262B includes one or more SMCs; and memory appliance 260N provides access to memory 262N through host controller 261N, wherein memory 262N includes one or more SMCs. In one embodiment, the memory devices are configured as virtual memory, wherein distributed memory devices are accessible by each of the host controllers of the plurality of memory appliances.

In one embodiment, the host controllers of the plurality of memory appliances 260A-N are in communication to facilitate a distributed memory system 200. For example, an external communication interface is configured to provide communication between host controllers within the plurality of memory appliances 260A-N to provide access to memory virtualized across one or more memory appliance systems. The communication interface can include a fat pipe configured as a higher speed and higher bandwidth communications channel for communicating data, and a skinny pipe as a lower speed and lower bandwidth communications channel configured for communicating instructions/control.

Figure 3:
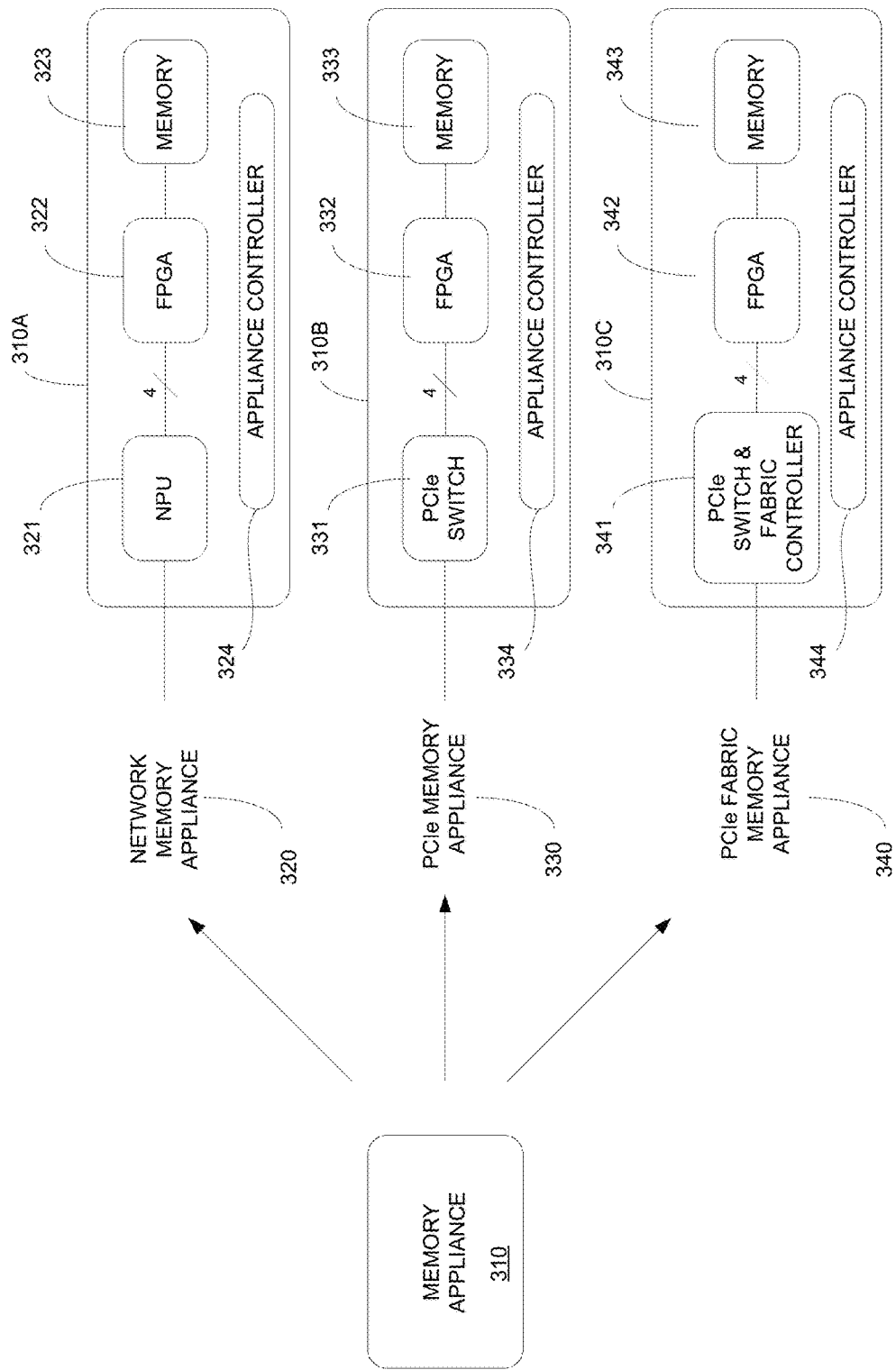
FIG. 3 is an illustration of various implementations of a memory appliance interface, in accordance with one embodiment of the present disclosure.

FIG. 3 is an illustration of various implementations of a memory appliance command interface within a memory appliance system 310, wherein the interface is established to facilitate communication between a host controller and one or more SMCs within a memory appliance 310, in accordance with one embodiment of the present disclosure. These examples are provided for illustration only as various other implementations of a memory appliance interface are supported.

In the first example, the memory appliance system 310 is implemented as a network based memory appliance system 310A. For instance, the memory appliance system 310A is supported by a network interface, and includes a NPU 321 that is coupled to one or more SMCs (e.g., four as shown in FIG. 3), wherein each SMC includes a programmable FPGA 322 and memory 323, as previously described. For example, NPU 321 is coupled to a host controller via a network interface in order to pass commands and data. That is, the network interface relies on network addresses identifying the network nodes of the host controller and the network based memory appliance system 310A to deliver communications.

In the second example, the memory appliance system 310 is implemented as a PCIe memory appliance system 310B, wherein the PCIe provides a direct interface between the PCIe switch 331 of the host controller and the one or more SMCs (e.g., four as shown in FIG. 3). Each of the SMCs includes a programmable FPGA 332 and memory 333. For example, PCIe switch 331 is coupled to a host controller via a direct interface (e.g., PCIe) in order to pass commands and data. PCIe devices communicate via a point-to-point connection or interconnect, wherein a direct channel is established between two PCIe ports of computing device allowing both to send/receive ordinary PCIe requests and interrupts.

In the third example, the memory appliance system 310 is implemented as a PCIe fabric memory appliance system 310C. For instance, the memory appliance system 310C is supported by a PCIe fabric providing a direct interface between the PCIe switch and fabric controller 341 and one or more SMCs (e.g., four as shown in FIG. 3). Each of the SMCs in the memory appliance system 310C includes an FPGA 342 and memory 343. For example, a PCIe-based fabric enables straightforward sharing of I/O devices at low cost and utilizing a low power envelope. Direct coupling of the host controller to the PCIe fabric, and then to memory does not require other intermediary devices, as in an Infiniband network. For example, the PCIe fabric controller 341 is coupled to a host controller via a direct interface through a PCIe-based network fabric in order to pass commands and data. The PCIe based fabric is used as a unified fabric to replace traditional communication interconnects (e.g., replace small Infiniband clusters) to achieve high-speed clustering.

Figure 4:
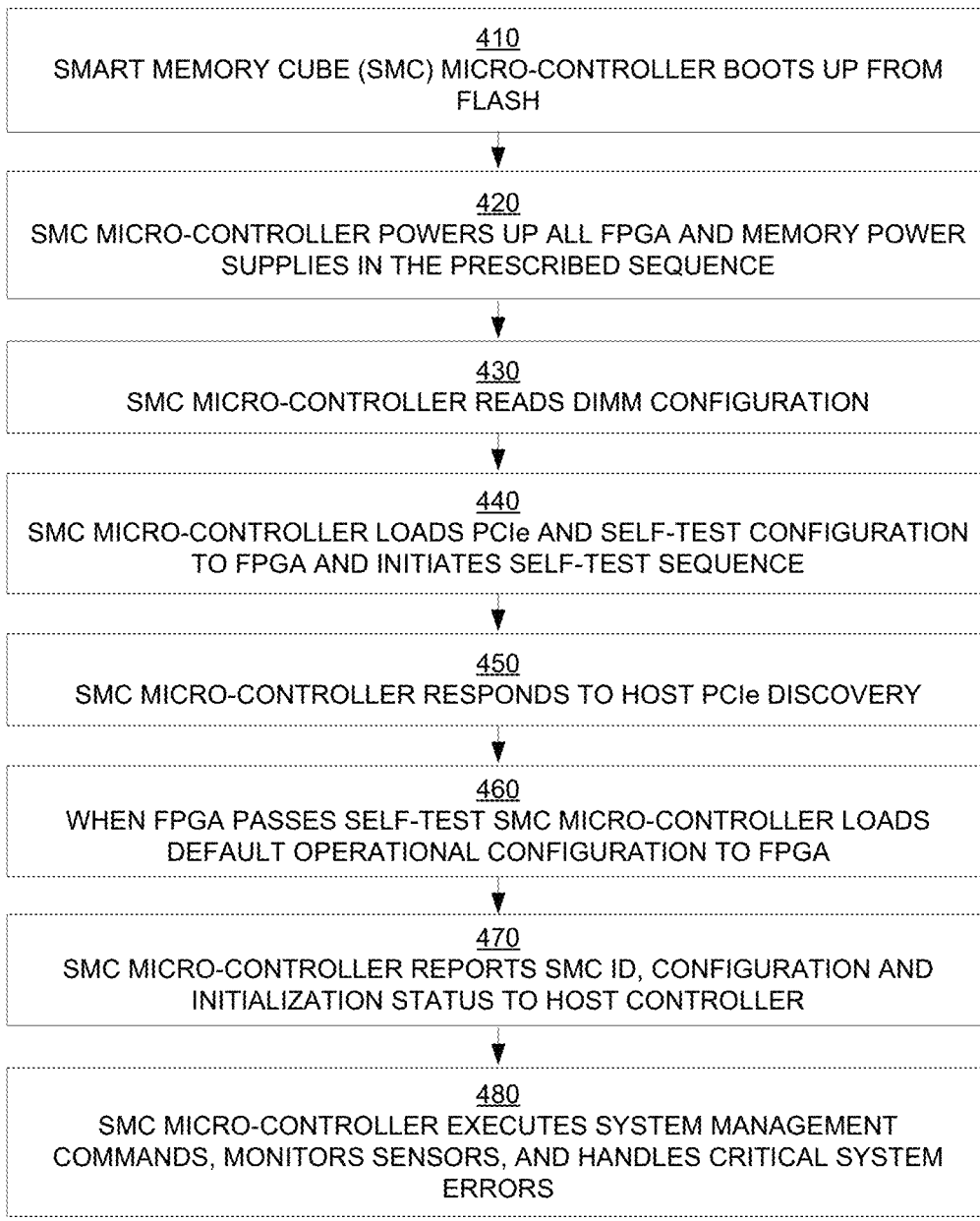
FIG. 4 is a flow diagram illustrating steps in a method for a Smart Memory Cube power up sequence, in accordance with one embodiment of the present disclosure.

FIG. 4 is a flow diagram 400 illustrating steps in a method for an SMC power up sequence, in accordance with one embodiment of the present disclosure. Diagram 400 is described within the context of a memory controller including an SMC having a SMC controller implementable as an FPGA communicating over a PCIe interface with a host controller, though other SMC configurations are contemplated and supported. In still another embodiment, flow diagram 400 illustrates a computer implemented method for implementing an SMC power up sequence within a corresponding SMC of a memory appliance. In another embodiment, flow diagram 400 is implemented within a computer system including a processor and memory coupled to the processor and having stored therein instructions that, if executed by the computer system causes the system to execute a method for implementing an SMC power up sequence within a corresponding SMC of a memory appliance. In still another embodiment, instructions for performing a method as outlined in flow diagram 400 are stored on a non-transitory computer-readable storage medium having computer-executable instructions for implementing an SMC power up sequence within a corresponding SMC of a memory appliance. The method outlined in flow diagram 400 is implementable by one or more components of the computer system 1700, storage system 1800, and memory appliance systems 100A-B of FIGS. 1A-B.

Flow chart 400 describes operations which can be implemented by a SMC including an FPGA and separate microcontroller, wherein the FPGA acts as a memory controller and the microcontroller performs general management. As such, in some embodiments, the microcontroller can perform the power-up sequence illustrated in flow chart 400, while in other embodiments, the microcontroller is implemented within the FPGA, and the FPGA can perform the power-up sequence illustrated in flow chart 400.

At 410, the method includes booting up the SMC controller from non-volatile memory (e.g., FLASH). At 420, the method includes having the SMC controller power up all the FPGA and memory power supplies in a prescribed sequence. At 430, the method includes having the SMC controller read the DIMM configuration for the attached memory. At 440, the SMC controller loads the PCIe and self-test configuration to the FPGA and initiates a self-test sequence. At 450, the SMC controller responds to the host controller PCIe discovery, while simultaneously checking the DIMM memories. At 460, the SMC controller loads a default operational configuration to the FPGA if the FPGA passes the test. In another implementation, the host controller is configured to load the operational configuration via the PCIe interface. At 470, the SMC controller reports the SMC, brick or unit identifier, configuration and initialization status to the host controller. At 480, the SMC controller executes system management commands, monitors sensors, and handles critical system errors. For example, the SMC controller executes system management commands received from the host controller (e.g., loads custom FPGA configuration, updates its own and FPGA boot flash, enters/exits power stand-by or power off, sets clock, etc.). Also, the SMC controller monitors all sensors (e.g., temperature, power supplies, etc.), and FPGA status periodically, and reports it back to the host controller. In another case, the SMC controller handles critical system errors (e.g., power brownout, overheating, hardware failures, etc.).

Application Aware Acceleration of Programmable Memory Interfaces in a Memory Appliance System In one embodiment, the memory appliance 100A of FIG. 1A includes a plurality of programmable SMCs, wherein a host controller communicates with the programmable SMCs to control management of data across the memory appliance 100A. Each of the SMCs includes a programmable interface or SMC controller for independently controlling one or more groupings of memory devices within that SMC. For example, in SMC 140A, programmable SMC controller 141 is configured to perform one of a plurality of predefined or on-the-fly, compiled functionalities for managing data within memory 142.

In one embodiment, each SMC controller is configured to provide custom acceleration of data operations performed on corresponding memory or memories (e.g., memory device or devices). For example, SMC controller 141 may be configured to handle one or more application specific operations (e.g., search, get, store, and/or delete operations used for accessing memory using key-value functions in a Memecached memory system). In another example, a memory appliance including one or more SMCs is configured as a fast and large capacity disk, which can be used as a burst buffer in high performance applications, or as a fast swap space for virtual machines/operating systems, or as an intermediate storage used in a Map Reduce framework. In one embodiment, SMC controller 141 is programmable such as through an FPGA to handle a specific operation. In another embodiment, SMC controller 141 is programmed on-the-fly to handle an incoming operation. In still another embodiment, SMC controller is implemented through an ASIC that is configured to handle one or more application specific operations.

Some examples of programmable functionalities are listed, but not limited to, as follows: get, store, delete, minimum, finding a maximum, performing a summation, performing a table joint operation, finding and replacing, moving data, counting, error recovery, data manipulation, and data compression, and other data manipulation operations. In another embodiment, the function that is programmed includes a Hadoop operation within the open-source software framework (e.g., Apache Hadoop) that is configured for enterprise storage and/or large-scale processing of data sets. For example, the Hadoop operations include a map reducing operation.

In one embodiment, the function that is programmed for acceleration within the SMC controller 141 includes a DPA operation configured for protecting bit streams entering or exiting a corresponding SMC 140A. Specifically, DPA is performed to analyze the power signature of SMC 140A to extract any keys within a bit stream. DPA countermeasures can then be performed to secure SMC 140A from releasing information through analysis of power consumption by altering the power signature. In one embodiment, a counter DPA module is located within SMC 140A and is configured for performing DPA countermeasures on the SMC controller 141. For instance, control messages are delivered from the SMC controller 141 over a control channel through a control/network interface. These control messages may include a key (e.g., used within a Memcached memory system). Encryption may be performed to generate an encrypted bit stream that includes the key. DPA countermeasures are taken on the encrypted bit stream at the counter DPA module in order to prevent extraction other encryption keys, in one embodiment. In another embodiment, DPA countermeasures are taken within the SMC controller 141 to mask its power signature when executing commands in the encrypted bit stream. In still another embodiment, a counter DPA module is located at the host controller to perform DPA at the host controller 110 level.

In still another embodiment, the function that is programmed includes a recovery operation to recover from failures within the memory appliance (e.g., DIMM, SMC, bit, etc.).

In one embodiment, the programmability of a corresponding SMC controller, such as, SMC controller 141 in SMC 140A, may be performed through the selection of one or more configuration files in a library. The configuration files are used to reconfigure the corresponding programmable interface of programmable SMC controller 141 to perform one of a plurality of predefined or on-the-fly generated functionalities. In one embodiment, the host controller 110 accesses one of the configuration files in order to reconfigure programmable SMC memory controller 141 in association with a command directed to the SMC 140A. In another embodiment, SMC memory controller 141 accesses one of the configuration files in order to reconfigure itself in association with a command directed to the programmable SMC 140A.

In another embodiment, the programmability of a particular SMC controller, such as, SMC controller 141 of SMC 140A, may be performed on-the-fly through the compilation of acceleration functions to generate a configuration file. A configuration file is used to reconfigure the corresponding programmable interface of programmable SMC controller 141 to perform one of a plurality of predefined or on-the-fly generated functionalities. That is, programmable SMC controller 141 is reconfigured on-the-fly in response to a command directed to memory associated with the programmable SMC 140A that is delivered from the host controller 110.

FIG. 5 is a flow diagram illustrating a method for a memory appliance implementing application aware acceleration within a corresponding SMC, in accordance with one embodiment of the present disclosure. In still another embodiment, flow diagram 500 illustrates a computer implemented method for implementing application aware acceleration within a corresponding SMC of a memory appliance. In another embodiment, flow diagram 500 is implemented within a computer system including a processor and memory coupled to the processor and having stored therein instructions that, if executed by the computer system causes the system to execute a method for implementing application aware acceleration within a corresponding SMC of a memory appliance. In still another embodiment, instructions for performing a method as outlined in flow diagram 500 are stored on a non-transitory computer-readable storage medium having computer-executable instructions for implementing application aware acceleration within a corresponding SMC of a memory appliance. The method outlined in flow diagram 500 is implementable by one or more components of the computer system 1700, storage system 1800, and memory appliance systems 100A-B of FIGS. 17, 18, and 1A-B, respectively.

At 510, the method includes receiving a command at a host controller of a memory appliance system. As previously described in relation to FIG. 1A, the host controller manages data across one or more of a plurality of SMCs communicatively coupled together through a network. Each SMC comprises memory (e.g., one or more memory devices packaged into one or more DIMMs) and a programmable SMC memory controller for managing data within the memory. The command is directed to a first programmable SMC memory controller.

At 520, the method includes determining a function type corresponding to the command. The function type is determined on-the-fly at the host controller, in one embodiment. For example, the client application sends the function type when also sending the command and/or request. In that manner, the host controller can forward the information to the corresponding SMC, or can retrieve the proper configuration file for delivery to the SMC in association with the command and/or request. In one embodiment, the function type is associated with a first configuration file, wherein the first configuration file is used to reconfigure the first programmable SMC memory controller in order to execute the command and/or request. In one embodiment, the configuration file is a bit file. In another embodiment, the configuration file is compiled from the command and/or request by the host controller, and then delivered to the programmable SMC controller.

Once the function type is known, the method includes accessing the first configuration file from a library of configuration files. As such, the first configuration file can be used to reconfigure, or reprogram, or preprogram the first programmable SMC memory controller in association with the command and/or request.

In another embodiment, the first configuration file is compiled from an application including the command. That is, the first configuration file is generated on-the-fly. The first configuration file is then provided to the first programmable SMC controller.

As such, the method includes receiving the first configuration file at the first programmable SMC memory controller. The method also, includes loading the first configuration file at the first programmable SMC memory controller, and reprogramming the first programmable SMC memory controller using the first configuration file. As a result, the first programmable SMC memory controller is configured to and executes the command.

Some examples of programmable functions include, but is not limited to the following: get, store, delete, minimum, finding a maximum, performing a summation, performing a table joint operation, finding and replacing, counting, a DPA operation configured for protecting bit streams entering or exiting a corresponding SMC, an authentication operation configured to authenticate components of a corresponding SMC against authorized signatures, and a recovery operation.

Reliability, Availability, and Serviceability (RAS) within a Memory Appliance Including Programmable Memory Interfaces RAS features are included within a memory appliance system to maintain throughput with acceptable latencies, and to address memory errors without unduly access to memory. Reliability gives an indication of how long a memory system will give correct data outputs, and utilizes detection of errors, and correction of those errors. Availability gives the probability that a memory system is available at any given point in time. Serviceability or maintainability gives an indication as to how simple or complicated is a memory system's recovery process, and provides a clue as to the performance of reliability and availability of the memory system. The RAS features are implemented within the memory appliance systems 100A-B of FIGS. 1A-B, in some embodiments.

A memory appliance system (e.g., memory appliance system 100A of FIG. 1) comprises a plurality of SMCs, wherein each SMC includes a programmable SMC controller for independently controlling one or more groupings of memory within that SMC. A host controller communicates with the programmable SMC controllers combined to control management of data across the memory appliance system. Each SMC comprises memory and a programmable SMC controller, wherein the SMC controller includes a programmable interface for managing data within the memory. In particular, the programmable interface is used to accelerate functions performed on a corresponding memory or memories, as previously described. Redundancy of data within an SMC is provided using memory in other SMCs. Further, during recovery of a particular SMC, the programmable FPGA within the SMC is reconfigured to perform recovery functionality, and in particular communicates with the other SMCs to retrieve backup data in order to reconstruct the data files in the crashed SMC.

In particular, the memory appliance includes first memory in a first SMC for storing first data. Redundancy of the first data is located on one or more remaining SMCs in the memory appliance, or across one or more memory appliances. In particular, the memory appliance includes second memory that is included in the one or more remaining SMCs for storing second data, wherein the second data comprises redundant data of the first data. The remaining SMCs may be located within one or more memory appliances.

In one embodiment, the second data comprises a mirrored copy of the first data. That is, a mirrored copy of memory groupings in one SMC is mirrored within another memory grouping in another SMC. As an example of mirroring, two SMC controllers are configured to execute the same instructions (e.g., nearly simultaneously). Mirroring may occur in any grouping of data (e.g., RANK, DIMM, etc.).

In other embodiments, explicit copying or moving of data is performed for data redundancy. In one implementation the copying or movement of data is performed via programmed I/O. In another implementation, the copying or movement of data is performed directly via a DMA channel. As examples, a RANK of memory within a DIMM may be copied or moved to another RANK. Also, a DIMM may be copied or moved to another DIMM. Other groupings of data are supported.

In another embodiment, the redundant second data is striped across one or more remaining SMCs, wherein the SMCs are included within a memory appliance, or are included across one or more memory appliances. As such, data is interleaved across the one or more remaining SMCs, thereby providing increased prevention of data loss, and quicker access to data.

In one embodiment, the redundant data is managed between host controllers at the memory appliance level. For instance, a plurality of memory appliances includes a first memory appliance system and another, or second, memory appliance system. Both memory appliance systems are similarly configured, such as, that described in FIGS. 1A-B. Each of the memory appliance systems include a host controller for managing data across a corresponding plurality of SMCs. Further, an external communication interface is configured to provide communication between host controllers of the plurality of memory appliances to provide access to memory virtualized across one or more memory appliance systems. The external communication interface also provides redundancy of data and recovery of data. For example, the communication interface includes a fat pipe as a higher speed and higher bandwidth communications channel pipe configured for communicating data, and a skinny pipe as a lower speed and lower bandwidth communications channel configured for communicating instructions/control.

In still another embodiment, redundant data is managed at the programmable SMC controller level. That is, SMC controllers communicate with each other to manage storage of redundant data, and recovery of redundant data. That is, a communication interface is established to provide communication between a plurality of SMCs in order to provide redundancy and recovery of data.

As previously described, each programmable SMC controller includes a programmable interface for managing data within corresponding memory. In particular, the programmable interface is used to accelerate functions performed on corresponding memory or memories (e.g., memory device or devices). In one embodiment, the programmable interface is configured to perform reconstruction of data within the corresponding memory.

In another embodiment, an SMC is configured to provide for internal redundancy to protect against catastrophic failure. For example, memory within an SMC platform includes DRAM memory devices for storing data, and non-volatile memory devices (e.g., FLASH, EEPROM) configured for backing-up the DRAM memory devices during failover. For example, the density of FLASH devices can be typically five to ten times that of DRAM memory devices. In this example, one-tenth of the number of DRAM devices, in the form of FLASH devices, can be used to back-up a number of DRAM devices. The backing-up may occur periodically, or upon failure, wherein upon failure, the data from DRAM is immediately stored in the FLASH devices. In another embodiment, for serviceability, a SMC is a field replaceable item, and designed to be hot-swap capable.

In another embodiment, the SMC is configured to provide another way for internal redundancy to protect against catastrophic failure. Specifically, a back-up power source (e.g., battery, capacitors, ultra-capacitors, super-capacitors, electrical double-layer capacitors, pseudo-capacitors, etc.) is provided to provide back-up power to the memory devices. In that manner, data is preserved until more permanent back-up of the data is performed. For example, the battery back-up provides power to memory devices packaged in a DIMM of DRAMs of a corresponding SMC. The DRAMs are powered to enable further copying of the data to more permanent devices, such as, FLASH memory devices, previously described.

Reducing Latency within a Memory Appliance

A reduction in latency is required for acceptable performance of a memory controller. Latency may be incurred throughout the delivery of high level commands, and the returned results. In particular, the communication process includes receiving high level commands from a client, delivering the high level commands from a host controller to one or more SMCs executing related primitive commands over an SMC interface, and returning results back to the client device. The reduction in latency is achieved within the memory appliance systems 100A-B of FIGS. 1A-B, in some embodiments.

Embodiments of the present disclosure provide for improved memory density and power efficiency for network-attached DRAMs in a distributed memory environment, such as memory appliance systems 100A-B of FIGS. 1A-B. Specifically, embodiments of the present disclosure reduce the amount of time a host controller/processor 110/112 handles data movement and I/O through translating high level commands to primitive operations that are handled and controlled by corresponding SMCs 140A-N. As the memory size increases for each SMC, an increased reduction of processor I/O is realized because network latency has a disproportionate affect on payloads inversely proportional to their size in embodiments of the present disclosure. More succinctly, the larger the data, the less it is actually impacted by latency. This is because the cost of round-trip-times is amortized across more data as payload sizes grow.

Figure 6A:
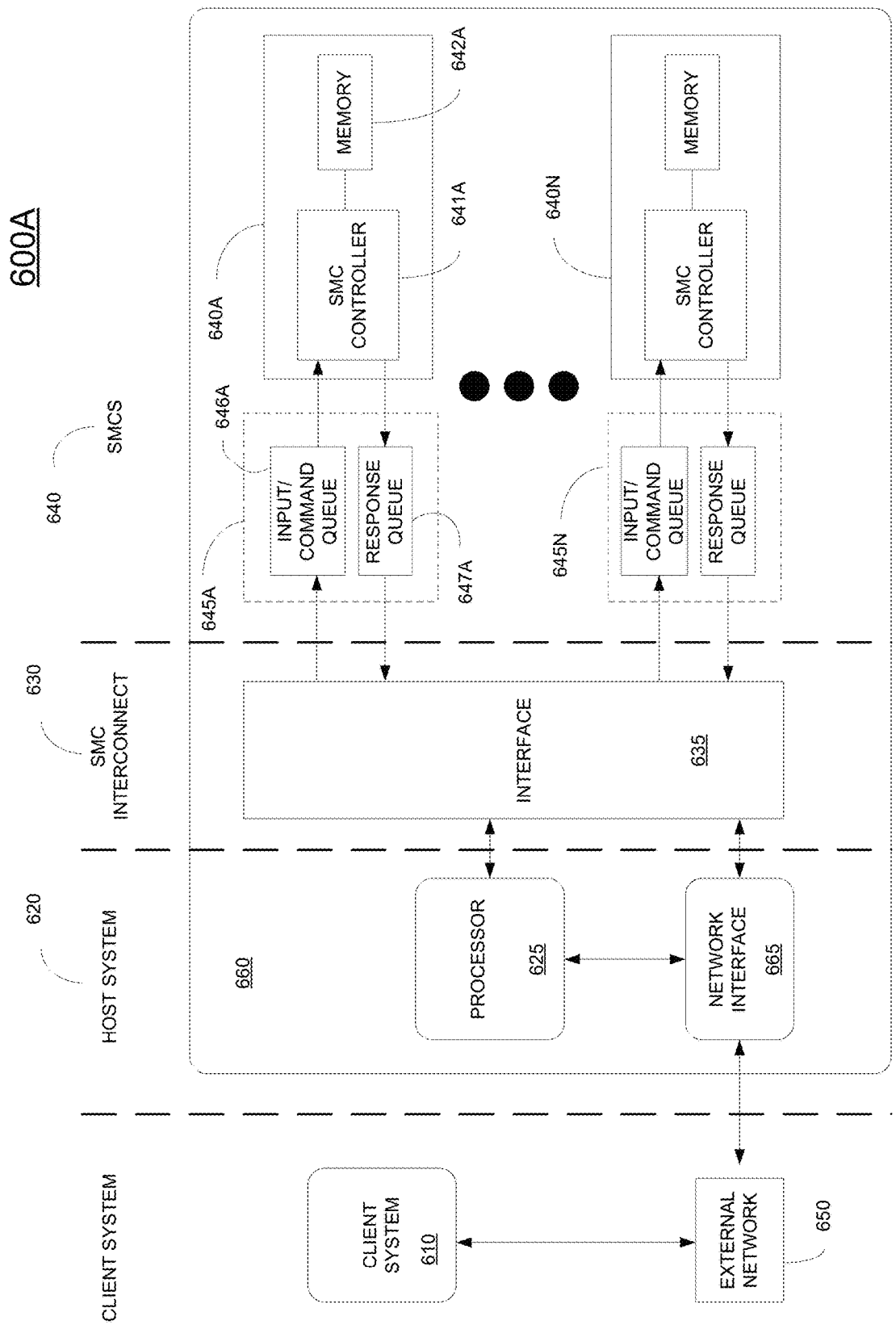
FIG. 6A is a block diagram of a system including a client system communicatively coupled with a memory appliance, wherein the memory appliance is configured to translate high level instructions into lower-level assembly code style primitive operations that are executable by a plurality of SMC controllers implemented as FPGAs and/or ASICs, in accordance with one embodiment of the present disclosure.

Embodiments of the present disclosure optimize data movement between SMC memory and the outbound NIC (such as NIC 665 in FIG. 6A). Using Facebook as the canonical Memcached use case, it is expected that greater than ninety percent of all requests to be UDP-based "GET" requests. Research on Facebook's use of Memcached shows that greater than ninety percent of objects are five-hundred bytes or less in size with hit rates in the cache approaching ninety-eight percent. For example, embodiments of the present disclosure optimize data movement between the SMC memory and the outbound NIC when processing the GET requests, while limiting host controller involvement. Specifically, UDP response packets are prepared by the FPGA (of the SMC controllers 140A-N), while the NIC receives DMA packets directly from device memory without using the host controller/processor. In general, after the FPGA initiates the transfer of data over a DMA channel in cooperation with the host controller/processor (e.g., the host controller is notified of the result from the command and/or request), the DMA controller handles the transfer of data from device memory to the NIC without involving the host controller. For instance, the DMA controller is configured to generate an interrupt that notifies the FPGA when the transfer is complete. This eliminates unnecessary copying from device memory to system memory prior to transmitting a packet because the involvement of the host controller is limited.

In one embodiment, a memory appliance system comprises a plurality of SMCs, wherein each SMC includes a programmable SMC controller for independently controlling one or more groupings of memory within that SMC. A host controller communicates with the programmable SMC controllers combined to control management of data across the memory appliance system. Each SMC comprises memory and a corresponding programmable SMC controller, wherein the programmable SMC controller comprises a programmable interface for managing data within the memory. The programmable interface is used to accelerate functions performed on a corresponding memory or memories.

In one embodiment, the host controller pushes a command to a corresponding SMC over an interconnect (e.g., network or direct interface) in the form of one or more primitive operations. In another embodiment, the host controller pushes a pointer to a command and its corresponding primitive operations that are stored in memory to a corresponding SMC. The corresponding SMC retrieves the command and/or the primitive operations from memory using the pointer. In still another embodiment, a corresponding SMC polls a host queue of a host controller to discover commands directed to that corresponding SMC. Upon discovery, the command and/or primitive operations are pulled and delivered to the corresponding SMC. Thereafter, the corresponding SMC handles the execution of the command and/or primitive operations. In one embodiment, a pointer to the data contained within memory is returned.

Latency is reduced within the SMC by shrinking the data path between the device memory and the NIC supporting one or more SMCs within a memory appliance that is configured for external communication. The NIC is configured to provide external communication for the one or more plurality of SMCs. Specifically, latency is reduced by establishing communication directly between memory of a corresponding SMC and the network interface. For example, DMA is used to allow the NIC direct access to memory within a corresponding SMC (e.g., a pointer) to enable the delivery of data across the external network. In particular, communication is established directly between memory of a corresponding SMC and the NIC via a DMA controller for purposes of transferring data between the memory and the NIC over a DMA channel. For example, a DMA register/stack operates independently of the host controller's command stack to hand off DMA addressing thereby providing direct access to memory from the NIC, and vice versa.

High Level Instructions Translated to Lower-Level Assembly Code Style Primitives within a Memory Appliance Architecture Embodiments of the present disclosure provide for a memory appliance that includes a processor and a plurality of SMCs, wherein each SMC includes a plurality of memory devices, and an SMC controller for independently controlling the management of one or more groupings of memory within a plurality of memory devices of a corresponding SMC. The memory appliance is configured to receive high level instructions from a client system (e.g., OSI layer 7 protocol or interface commands), and to translate the instructions into lower-level assembly code style primitive operations that are executable by the plurality of SMC controllers. That is, high-level, application layer commands are translated to primitive operations (e.g., low level operations corresponding to machine code instructions) for execution by the corresponding computing device (e.g., SMC controller).

The methods and systems disclosing the translation of high level instructions to lower-level primitive operations in embodiments of the present disclosure are implementable within the systems and flow diagrams described in FIGS. 1-5. For example, the memory appliance systems 100A-B of FIGS. 1A-B are configured to receive high level instructions from a client system and translate those instructions into lower-level primitive operations that are formatted for execution by a plurality of SMC controllers each configured to manage corresponding memory devices.

FIG. 6A is a block diagram of a memory system 600A including a client system 615 that is communicatively coupled with a memory appliance 660, wherein the memory appliance 660 is configured to translate high level instructions into lower-level assembly code style primitive operations that are executable by a plurality of SMC controllers implemented as FPGAs and/or ASICs, in accordance with one embodiment of the present disclosure. The memory appliance system provides for a higher capacity and higher bandwidth scaling of memory and computation offloading to the memory within the memory appliance having the SMC controller manage the execution of the primitive operations.

As shown in FIG. 6A, memory system 600A includes a client system 610 and a memory appliance system 660, wherein the memory appliance system can be further partitioned into a host system 620, an SMC interconnect/interface 630, and a plurality of SMCs 640. The client system 610 is communicatively coupled with the memory appliance system 660 over an external network 650. For example, the external network 650 allows two different computing systems to communicate using a communication protocol.

In particular, client system 610 provides an interface to the memory appliance system 660. The host system relays client side requests and commands used for accessing data stored within the memory appliance system. In particular, client system 610 is configured to deliver a high level command/instruction to the memory appliance system 660 for execution. For example, the command may be implemented within the highest layer of the OSI model—application layer 7. That is, the command is formatted as a protocol or interface used for computer systems across a communication network. Though one memory appliance system 660 is shown coupled to the client system 610, it is understood that client system 610 may be coupled to one or more memory appliances providing distributed memory storage.

For illustration purposes only, client system 610 may be a database system, managed by a social networking company, storing data about its members in distributed memory, and is accessing data contained within the memory appliance system 660. In the example, client system 610 may be accessing and managing data stored within the memory appliance 660 using high level commands. As an example, the memory appliance 660 may be structured as a Memecached memory system, wherein the client system 610 accesses data using Memecached application layer instructions. In another illustration, the client system 610 may be a computing resource associated with a user, wherein the computing resource is used for accessing information across an external network 650 that is stored on the memory appliance 660.

As shown, the host system 620 of the memory appliance system 660 includes a processor 625 and a communications or network interface 665. The network interface 665 communicatively couples the memory appliance system 660 to the external network 650, such that client system 610 is able to communicate with memory appliance system 660 using a communication protocol. In one implementation, the network interface 665 can be a NIC. In another implementation, the network interface 665 is internal to an NPU. For instance, client system 610 delivers a high level command through the external network 650 to the NIC 665.

Processor 625 is configured as a host controller that manages a plurality of memory devices distributed throughout a plurality of SMCs, as previously described. For example, processor 625 is able to provide memory services, such as, load balancing, quality of service, connection management, and traffic routing.

As shown, processor 625 is configured to receive a high level command originating from the client system 610 via the NIC 665, and translate the high level command into application specific primitive commands or operations that are formatted by execution by the plurality of SMCs 640. For example, the high level command may be structured to access memory in a Memecached distributed memory caching database using a key value pair or key-value functions to access memory. For example, a key within a command is hashed using the appropriate algorithm in order to determine proper addressing within the memory. Typical key value functions include "GET" "SET", and "DELETE" operations.

Further, the high level command is translated by processor 625 into one or more primitive operations executable by the SMCs to access memory. For instance, the primitive operations are function or application specific (e.g., search, sort, and other custom accelerations, such as, error recovery, data manipulation, data compression). In the example of a Memecached database, the primitive operations are tailored for accessing and manipulating data, and/or may be tailored for performing a specific operation (e.g., search, write, etc.) to memory in the Memecached database. For instance, "GET" is implemented with a set of primitive operations that search for a key match, retrieve pointer to value field and update the key-value metadata.

Processor 625 is coupled to one or more communication channels over the SMC interconnect 630. For instance, interconnect 630 is a command interface 635 that allows for the primitive operations to be delivered from the processor 625 to the plurality of SMCs 640 over one or more communication channels, wherein the primitive operations are configured for accessing memory distributed throughout the SMCs. In one implementation, interface 635 includes communication channels configured as a network interface (e.g., TCP, UDP, Ethernet, Infiniband, etc.) using a network protocol. In another implementation, interface 635 includes communication channels configured as a direct interface (e.g., PCI, PCIe, XAUI, QuickPath, Infiniband, Serial Rapid IO (SRIO), 1/10/40/100 Gigabit Ethernet, Interlaken, Fiber-Channel, FiberChannel over Ethernet (FCoE), SAS, iSCSI, SATA, other protocols using Ethernet as an underlying layer, etc.) that provides for communication over a point-to-point communication channel/link/connection between two ports.

In one embodiment, the primitive operations and results are delivered to optional queue combinations 645A-N, wherein each queue combination is associated with a selected SMC. Each queue combination includes an input queue (e.g., delivering commands to the SMC controller) and a response queue (e.g., returning results after executing commands). In other embodiments, each SMC can have a plurality of matched queues combinations, rather than a single queue combination per SMC. Each of the individual queues may be located on either side of interface 635, such that they may be co-located on one side, or separately located on opposite sides of interface 635. For example, queue combination 645A is associated with SMC 640A, and includes input queue 646A and response queue 647A. In that manner, primitive operations are asynchronously executed by the plurality of SMCs 640.

Figure 6B:
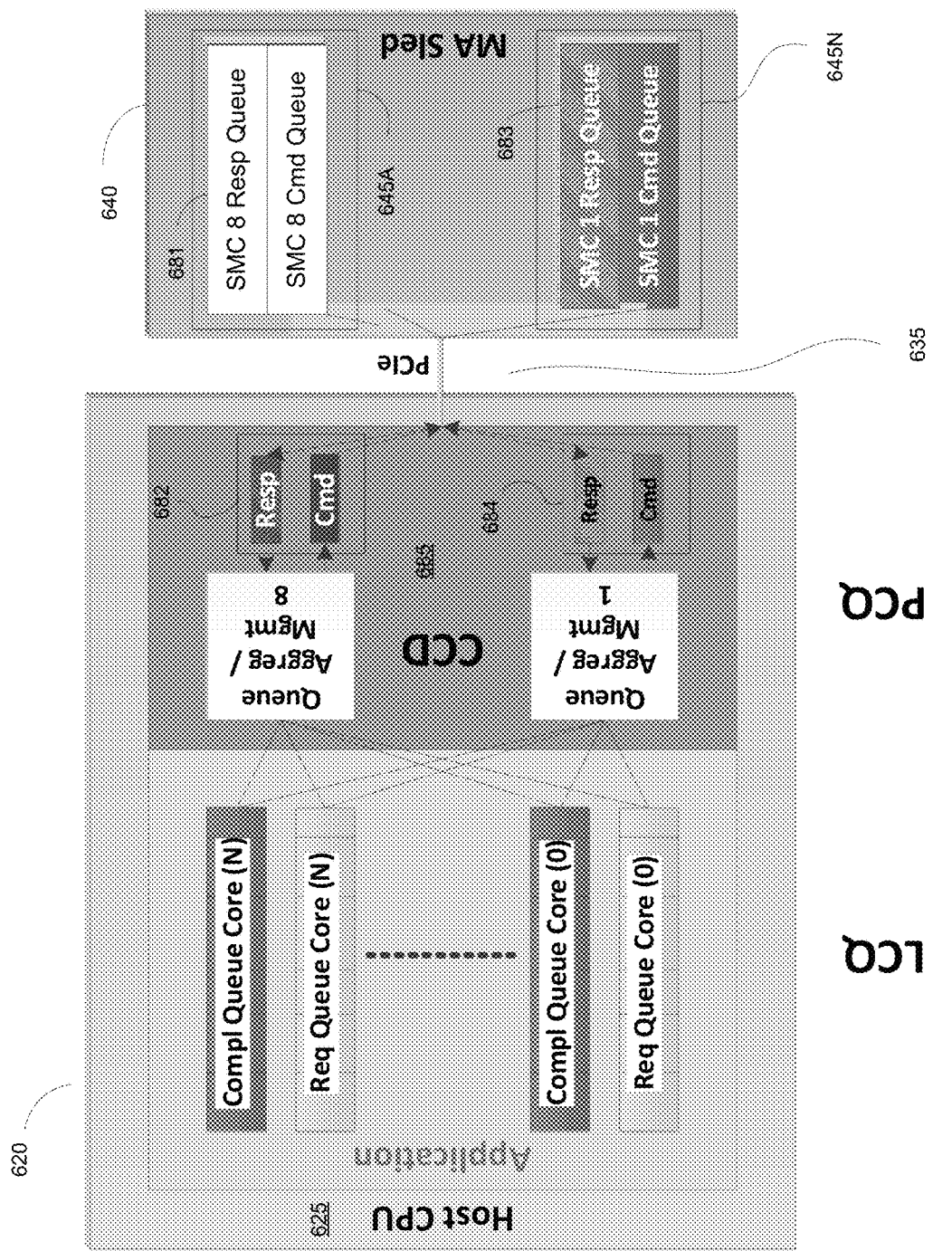
FIG. 6B is an illustration of matching queue pairs between a host processor and one or more SMCs, in accordance with one embodiment of the present disclosure.

FIG. 6B illustrates one embodiment of input/command queue pairs and response queue pairs located on either sides of an interface 635 for the memory system 600A shown in FIG. 6A, in accordance with one embodiment of the present disclosure. That is, an input/command queue located on the at one of the plurality of SMCs 640 has a matching input/command queue located on the host system 620. As shown in FIG. 6B, a host system 620 includes a host CPU/processor 625 configured to execute a data storage application (e.g., Memecached). The host system sends primitive commands to the plurality of SMCs across an interface 635, such as PCIe.

As shown, matching queue-pairs are located on opposite sides of the interface 635 (e.g., PCIe), wherein each SMC command/response queue-combination has a matching pair or counterpart command/response queue-combination maintained by the host processor 625. For example, an SMC controller (not shown) in a corresponding SMC 645A manages command/response queue-combination 681 (e.g., SMC command queue and response queue), which has a matching pair or counterpart command/response queue-combination 682 managed by processor 625. In that manner, the host processor 625 is able to perform under a fire and forget module by loading commands into a corresponding command queues, which are then delivered to corresponding SMCs for execution and returned back to the host processor 625 via matching command queue pairs and response queue pairs. As such, the overhead of executing the commands is transferred from the host processor 625 to the SMCs, thereby reducing processor latency.

In general, processor 625 fills its command queue, the corresponding SMC controller reads it, and copies commands into its own queue. The SMC controller then places responses into its outgoing response queue before transferring them into the processor response queue across the interface 635. A CCD 655 manages the processor queue combination, while a SMC controller manages a corresponding queue combination. For example, queue aggregate/management 8 loads a command into the command queue in queue combination 682, which is then delivered over interface 635 and loaded into the matching command queue in queue combination 681 of the corresponding SMC 645A. In one embodiment, SMC 645A requests delivery of the commands between the matching command queue pairs. After processing, the response is loaded by SMC 645A into the response queue in queue combination 681, which is then delivered over interface 635 and loaded into the matching response queue in queue combination 682. In addition another SMC controller (not shown) of SMC 645N manages command/response queue-combination 683, which has a matching pair or counterpart command/response queue-combination 684 managed by host processor 625.

Returning to FIG. 6A, each of the plurality of SMCs 640 includes an SMC controller and a plurality of memory devices. The SMC controller includes an interface for managing data or memory throughout corresponding memory devices. For example, the interface may be used to accelerate functions performed on a corresponding memory or memories. For example, SMC 640A includes SMC controller 641A and memory devices 642A. An SMC controller may be programmable (e.g., FPGA) or statically configured (e.g., ASIC) to execute application specific commands and/or operations generated by an external client and/or application.

As shown in FIG. 6A, input queue 646A is configured to receive a plurality of primitive operations from processor 625 and deliver those primitive operations to the SMC controller 641A for execution on memory devices included in memory 642A. The primitive operations are translated from a high level command that is directed to memory on SMC 640A, and executed by SMC controller 641A. A result of the primitive operations is delivered to the result queue 647A for access by processor 625 or delivery to processor 625. In one embodiment, the result comprises a pointer to a memory location, wherein the data stored in that memory location satisfies the query associated with the high level command and/or plurality of primitive operations.

Further, in one embodiment the processor is notified of the result, and initiates a direct memory transfer (e.g., DMA) of the data stored in the memory location with the network interface 665 using the pointer. That is, once the direct memory transfer is initiated by processor 625, and the pointer is delivered to the network interface 665, the processor 625 no longer controls the transfer of data across the external network 650. In that manner, redundant and unnecessary copies of the data are not made within the local memory associated with the processor 625. For example, a direct memory transfer may be initiated as a DMA operation, wherein a DMA controller (not shown) monitors and/or controls the movement of data from memory 642A across the external network 650 via network interface 665 to the client system 610. In that case, the DMA controller may send an interrupt to the processor indicating that the data has been delivered across the external network 650.

Figure 7:
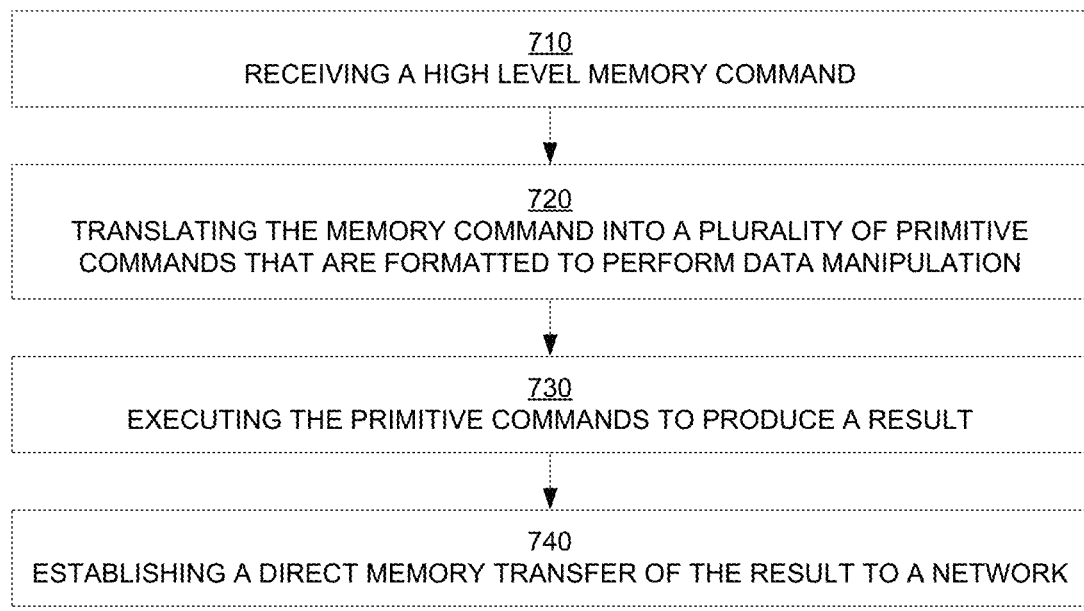
FIG. 7 is a flow diagram illustrating steps in a method for accessing data within a memory appliance that is configured to translate high level instructions into lower-level assembly code style primitive operations that are executable by a plurality of SMCs and their SMC controllers, in accordance with one embodiment of the present disclosure.

FIG. 7 is a flow diagram 700 illustrating steps in a method for accessing data within a memory appliance that is configured to translate (high level) instructions into lower-level assembly code style primitive operations that are executable by a plurality of SMCs and their SMC controllers, in accordance with one embodiment of the present disclosure. In still another embodiment, flow diagram 700 illustrates a computer implemented method for accessing data within a memory appliance that is configured to translate high level instructions into lower-level assembly code style primitive operations that are executable by a plurality of SMCs and their SMC controllers. In another embodiment, flow diagram 700 is implemented within a computer system including a processor and memory coupled to the processor and having stored therein instructions that, if executed by the computer system causes the system to execute a method for accessing data within a memory appliance that is configured to translate high level instructions into lower-level assembly code style primitive operations that are executable by a plurality of SMCs and their SMC controllers. In still another embodiment, instructions for performing a method as outlined in flow diagram 700 are stored on a non-transitory computer-readable storage medium having computer-executable instructions for accessing data within a memory appliance that is configured to translate high level instructions into lower-level assembly code style primitive operations that are executable by a plurality of SMCs and their SMC controllers.

The method outlined in flow diagram 700 is implementable by one or more components of the computer system 1700 (e.g., processor 1714), storage system 1800 (e.g., server 1845), and memory appliance systems 100A-B (e.g., processor 112, SMC controller 141, etc.) and 600A (e.g., processor 625, SMC controller 641A, etc.) of FIGS. 1A-B, 6A, 17, and 18 respectively. Further, in one embodiment, some operations performed in flow diagram 700 are further described in relation to information flow diagram 800 illustrating the execution of high level instructions that are translated to lower-level primitive operations when performing data manipulation.

Flow diagram 700 is implemented within a memory appliance that includes a processor acting as a host controller configured to manage a plurality of memory devices distributed throughout a plurality of SMCs. Each of the SMCs includes a processor and a plurality of memory devices, wherein the processor is configured to access memory in corresponding memory devices. For example, the plurality of memory devices includes memory devices (e.g., DRAM, EEPROM, FLASH, non-volatile memory, etc.) packaged in a DIMM.

At 710, the method includes receiving a high level command. For example, the high level command is received over a network using a communication protocol in one embodiment, the high level command can be a memory related command received from a client system that is in communication with a memory appliance via the communication protocol. The receiving can be performed by a processor, such as, a host controller that is configured to manage a plurality of memory devices distributed throughout a plurality of SMCs, as previously described. For example, the memory related command can be a high level command associated with the application layer-7 of the OSI model.

At 720, the method includes translating the command into one or more primitive commands. For example, the memory related command is translated into a plurality of primitive commands that are formatted to perform data manipulation operations on data of or within the plurality of memory devices. The memory devices are configured in data structures. In particular, the translating is performed by the processor. In addition, the processor is configured to route the primitive commands to the proper SMC for data manipulation, such as over a command interface. The command interface can be configured as a network interface or direct interface (e.g., PCIe). In this manner, the processor is able to hand-over control of the execution of the memory related command to the corresponding SMC, thereby reducing the amount of I/O traffic handled by the processor. That is, I/O traffic at the processor that would be associated with the transfer of data performed during the intermediate states of the primitive operations to the processor is reduced and/or eliminated, since the control of all the primitive operations can be performed by the SMC controller of the SMC to which the primitive commands were directed, such as a pointer.

At 730, the method includes executing the plurality of primitive commands on the data to produce a result. In particular, the executing is performed transparently to the processor by the SMC controller, such that the execution of commands occurs without processor input. As previously described, the processor has handed-over control of the execution of the primitive commands to the corresponding SMC controller, and only receives the result of the execution of the primitive commands. In one embodiment, the result comprises data that satisfies or is responsive to the high level command. In another embodiment, the result is associated with additional information that is used to access the data that satisfies or is responsive to the high level command.

At 740, the method includes establishing a direct memory transfer of the result over the communication protocol to a network. In particular, the establishing is performed responsive to receiving the result by the processor, and the direct memory transfer is performed transparently to the processor. That is, the direct memory transfer is controlled by another device, such as, the network interface or a controller. For example, a DMA controller may be used to control the transfer of the result without participation from the processor.

In one embodiment, the result is associated with a pointer that is directed to a location of memory that stores data, wherein the data satisfies or is responsive to the original high-level command and/or the translated primitive operations. In particular, the pointer is stored in a buffer accessible by the processor and/or the network interface. Once the pointer, or notification of the pointer stored in the buffer, is received by the processor, the direct memory transfer of the data is initiated. That is, the processor hands over control of the transfer of data to a network interface providing communication over an external network. After initiation, the pointer is accessed by a network interface in the buffer, in one implementation. In another implementation, the processor delivers the pointer to the network interface. The pointer is used by the network interface to request and/or access the data at the previously described memory location, wherein the data is responsive to the high level command. Without further involving the processor, the data is returned to the network interface for delivery over the network, such as to a client device. Notification of the delivery may be delivered to the processor.

Figure 8:
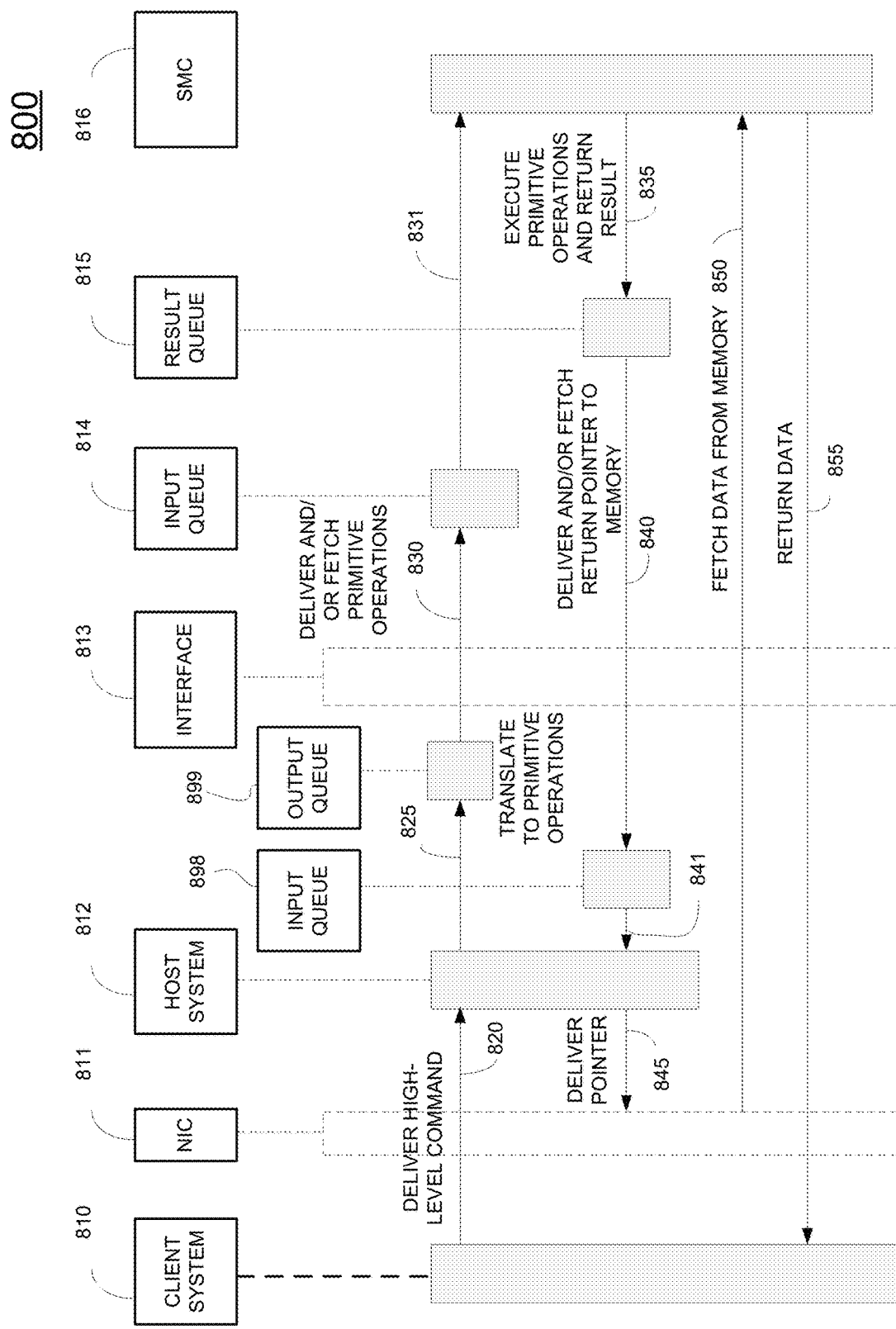
FIG. 8 is an information flow diagram illustrating the accessing of data within a memory appliance that is configured to translate high level instructions into lower-level assembly code style primitive operations that are executable by a plurality of SMCs and their SMC controllers, in accordance with one embodiment of the present disclosure.

FIG. 8 is an information flow diagram 800 illustrating the accessing of data within a memory appliance that is configured to translate high level instructions into lower-level assembly code style primitive operations that are executable by a plurality of SMCs and their SMC controllers, in accordance with one embodiment of the present disclosure. The information flow diagram 800 is implemented within a system including a client system 810 and a memory appliance, wherein the memory appliance includes a network interface (e.g., NIC) 811, a host system 812, an input queue 898 on the host side, an output queue 899 on the host side, a command interface 813 (e.g., PCIe), input queue, 814 on the SMC side, result queue 815 on the SMC side, and a corresponding SMC 816. The host system/processor 812 is configured to manage memory devices distributed throughout a plurality of SMCs, wherein each SMC includes an SMC controller and a plurality of memory devices. For example, SMC 816 includes an SMC controller and a plurality of memory devices, as previously described in relation to FIGS. 1A-B and 6A-B, wherein the SMC controller is a programmable logic device (e.g., FPGA) in one implementation, or a logic device with pre-determined functionality (e.g., ASIC).

As shown in FIG. 8, at 820 a high level command is delivered over a communication network from a client system 810 to the host system/processor 812 in the memory appliance via a network interface, such as, NIC 811. The NIC enables communication between the memory appliance and the client system 810 using a communication protocol over an external network.

At 825, the host system/processor 812 translates the memory related command into a plurality of primitive operations/commands. In addition, the processor is able to route the primitive commands to the proper SMC within the memory appliance through interface 813 (e.g., PCIe). For example, in one implementation, the proper SMC controls the physical memory within which data to be manipulated is stored. In that manner, the primitive commands can be grouped into a chain of commands that is directed to a specific SMC. At 825, the chain is placed into the output queue 899 of the host system processor 812 that corresponds to the proper SMC 816. At 830, SMC 816 fetches the chain from output queue 899 stores the primitive operations into its own input queue 814 through interface 813. In another embodiment, the primitive operations are delivered to the input queue 814 without traversing interface 813.

At 831, the primitive operations are fetched from the input queue 814 by the corresponding SMC 816 for execution. In particular, at 835 the SMC controller in the SMC 816 reads the primitive operations from the input queue 814, and executes the primitive commands as performed on the corresponding memory devices in SMC 816, wherein the execution is performed transparently to the host system/processor 812. The commands in the chain can be executed sequentially by the SMC controller. For instance, the primitive operations are performed on data stored in the memory devices, and include data manipulation instructions formatted for operation on data stored in blocks of memory within the memory devices. In that manner, the host system/processor 812 is able to hand off management and control of the execution of the high level command to the SMC controller in SMC 816, thereby reducing the number of I/O transactions handled by the host system/processor 812. That is, the high level command and/or primitive operations can be accelerated via the execution by the SMC controller.

At 835, execution of the primitive operations produces a result, and the host system/processor is notified of the result. In particular, the result is stored in the result queue 815. In one embodiment, the result includes data that is stored at a location in the memory devices, wherein the data satisfies or is responsive to the high level command and/or primitive operations. In another embodiment, the result is associated with information that leads to the data that satisfies or is responsive to the high level command and/or primitive operations. For instance, the information includes a pointer that identifies the location of memory that stores the data that satisfies or is responsive to the high level command and/or primitive operations.

At 840, the pointer is delivered across the interface 813 to the corresponding input queue 898 of the host system/processor 812. In one embodiment, the pointer is stored in a buffer that is accessible by the host system/processor 812. Upon notification, the host system processor 812 is able to access the pointer stored in the buffer at 841.

At 845, a direct memory transfer is established to transfer the result over the external network to a client system using a communication protocol. In particular, the host system/processor may initiate the direct memory transfer, but after initiation, is no longer involved in the transfer of the result over the network. That is, the direct memory transfer is performed transparently to the host system/processor. For example, the direct memory transfer may be a DMA process that includes a DMA controller that establishes and manages the transfer of the result without participation of the host system/processor 812.

As shown in FIG. 8, upon initiation of the direct memory transfer, the pointer is delivered to the network interface 811, or NIC. At 850, the NIC811 fetches the data from the location in memory of the SMC 816 as directed by the pointer, wherein the data satisfies or is responsive to the high level command and/or primitive operations. At 855, the data is returned to the NIC 811, and then delivered to the client system 810 over the external network.

Command Chain of Primitive Operations Executable within a Memory Appliance Architecture In one embodiment, the primitive operations may be combined into a command chain, that is executable with input parameters. The command chain includes a set of primitive operations/commands and their arguments/parameters that implement a high-level application command (e.g., Memcached Get, Set, and Delete operations). All the commands in a chain are executed sequentially by a single processor engine or host controller of an SMC.

In one implementation, the host system/processor 812 of FIG. 8 (e.g., including a command copy daemon) places the command chain into input queue 814 acting as a circular PCQ in local memory. The CCD updates a PCQ queue tail register of the SMC controller (e.g., programmable FPGA), and the SMC controller fetches the command chain from the PCQ until reaching the Tail. Also, the SMC controller will update the head register after each transfer.

For execution of the command chains, a fetch engine in the host system/processor 812 reads the command blocks continuously until it fills its local FIFO, or reaches the Tail address. A command chain dispatch engine parses the magic header/checksum (wherein magic number identifies a protocol or file format, for example, and the checksum is used for debugging) and chain-size fields to confirm command block alignment and determine command chain size (may include checksum, magic number, and commands plus parameters). The dispatch engine then dispatches a complete command chain to the next available SMC controller. The magic header is also removed.

The selected SMC controller runs a command interpreter that maps each command in the chain into a corresponding procedure call and executes it. The SMC controller executes the commands of each chain sequentially. In other embodiments, the commands may be executed out of order, as long as the results are guaranteed.

Figure 9:
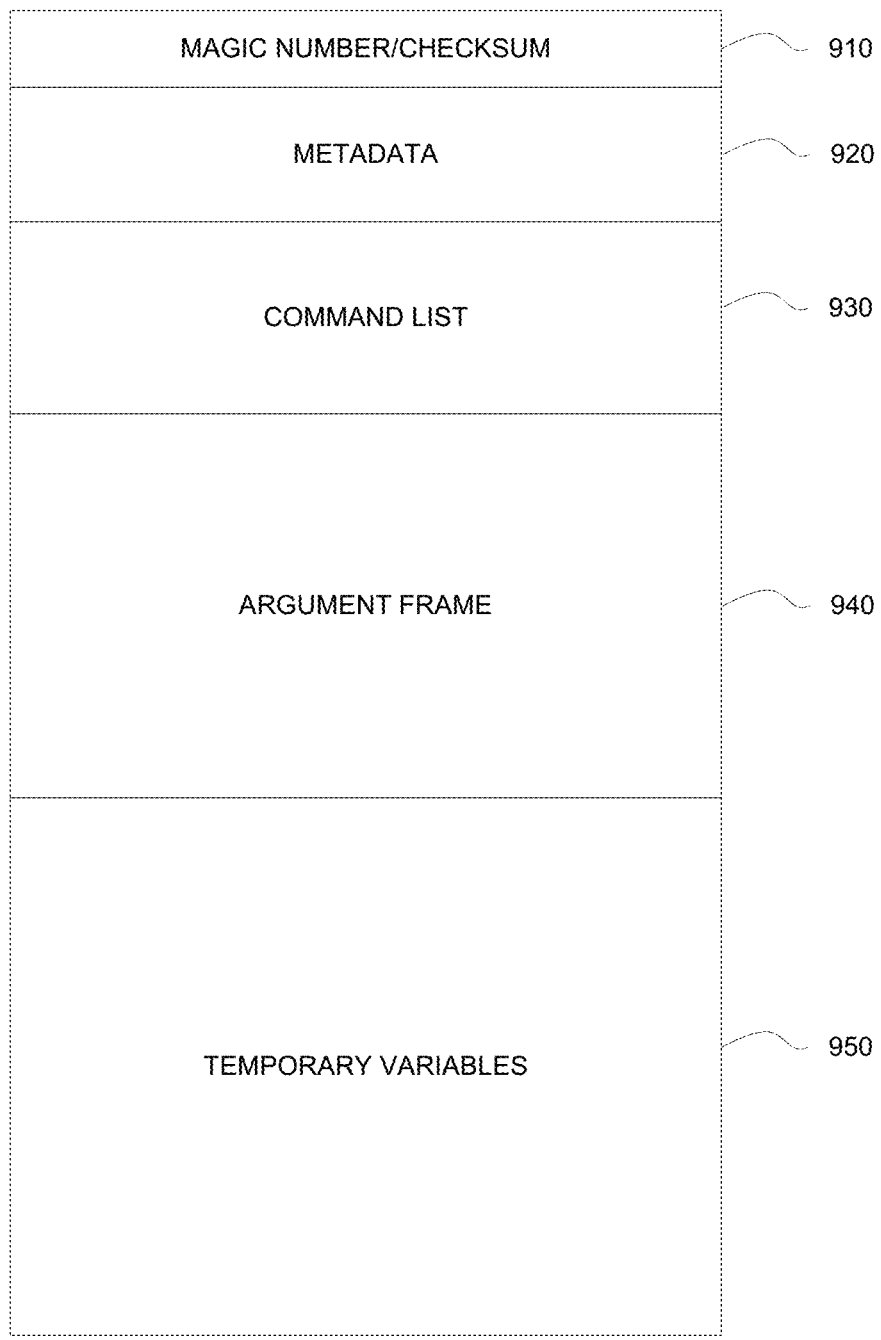
FIG. 9 is an illustration of a host system/processor local buffer used for storing a command chain, in accordance with one embodiment of the present disclosure.

The SMC controller generates a command response block which the SMC controller returns to CCD on command chain completion. Since sequential command chains are executed independently by different SMC controllers, they can and will in general complete out-of-order. Therefore, the host CCD driver cannot assume that response blocks will match the command chain order in the input command queue FIG. 9 is an illustration of a host system/processor 812 local buffer 900 used for storing a command chain, in accordance with one embodiment of the present disclosure. In one implementation, the host system/processor 812 allocates a fixed-size internal buffer (e.g., 1kB) for each command chain. In one embodiment, the command chains are multiples of 64 byte blocks and are 64 byte aligned. The last block may need to be padded if the command chain does not fill the entire block.

Each command chain includes various sections or frames. In one implementation, each frame is 8 byte aligned, wherein padding with Os may be necessary if the frame is not full. Frame 910 includes a magic number/checksum. Frame 920 includes metadata (e.g., opaque values, time stamps, etc.). Frame 930 includes a commands list, wherein each fixed-size list entry includes an operation code (opcode) associated with a command, and a set of associated parameter offsets that point into the parameters frame provided in section 940. For example, the op-codes may specify primitive operations on blob metadata (e.g., increment, decrement fields), primitive list operations (e.g., select, unlink, append, prepend, etc.), and flow control operations, such as, explicit (e.g., "jump-by-offset if parameter is 0"), implicit (e.g., conditional execution based on a status bit: if an command fails, all subsequent commands in chain are executed as NOPs), end of chain or return, procedure calls (e.g., address of another command chain located in SMC memory). The parameters/arguments frame 940 includes a contiguous region in the command blocks that stores parameters of all the commands, wherein parameters can be both inputs and outputs. Also, commands reference their parameters according to the offsets specified by the command fields. Inputs are passed as in-line values or as memory references via the command blocks. Command outputs are stored in the parameters frame at an offset corresponding to the result parameter. This allows subsequent commands to reference them during execution.

In one implementation, parameters are 8-byte aligned. Some parameter types include memory references in global address space (MAS, or MSes); immediate values, and intermediate variable-size values, wherein the first byte of the value defines its size (e.g., valid values include 1-255). Parameter offsets are relative to the parameter frame base and specify location as a multiple of 8 bytes. Offsets can address up to 256 parameters, 8-byte each, i.e. they can theoretically cover a 2 Kbyte range in the parameter frame. In addition, the base (first word) of the last variable-size value can be within this range, but the value itself may overflow beyond the 2 KB boundary. Multiple variable-length parameters can be supported as long as they all fit within the buffer allocated for the processor (1kB) and meet the 8-byte alignment requirements, otherwise zero-padding is required.

The buffer space left over after loading the command chain is reserved for temporary variables frame 950. For example, values to be generated at run time and passed between commands, or values to be returned via the response block are stored in frame 950. In this manner, frame 950 expands the size of the commands "register set" without bloating the command chain with dummy placeholders In one implementation, the command chain interpreter maintains a 32-bit global command status variable that is updated by each command. Besides flagging execution errors, global status can provide a fast path for the current command to convey specific results to the next command in the chain. For example, an error code may be returned if any error was detected during execution of a command. In the typical use scenario, a non-zero error field will abort the command chain and return this error code and its associated command index via the response block to the host. An example for using the return value field can be a Select command which returns the number of matching items via the global status and a pointer to the list of matching items via the parameter frame. A conditional Jump following Select can test the number of matches to decide whether to continue execution with the next command or jump ahead in the chain Each command chain returns a single response block to the CCD, in one implementation. The response blocks may have a fixed size of 64 bytes. A response block may include three frames, including a metadata frame (e.g., status, queue head pointer, opaque value, etc.); a completion status frame; and a retune parameters frame. The sections are each 8 byte aligned in one implementation. The return parameters can be a data value or a memory reference. Multiple, or variable size values are expected to be stored in the MS memory and they are returned by reference. The arguments of the last command in chain (RET) specify the parameter(s) to be returned to the host system/processor. The RET command is the last command in the command chain, and waits for all asynchronous DMSs initiated by commands belonging to the same chain to complete before it executes. The RET can specify a variable number of return values (e.g., 0 to 54) to be placed in the command response block. The number of values to be returned can also be specified in the RET. This mechanism can be used to pass more opaque data values via the command chain, as follows: insert the opaque value(s) as a dummy parameter in the chain and specify it as one (or more) of RET arguments.

Flow control operations include commands such as conditional and unconditional jumps. For example, the target jump offset relative to the current command is directly specified by the first command argument as an immediate 8-bit 2's complement value, rather than as a pointer to the value stored into the parameter frame.

Certain errors will cause a command chain to abort, and return an error code via the response block status. For example, an error code of "0" returns no error; an error code of "1" indicates an illegal chain size (e.g., size larger than 1 KB); error code of "2" indices an illegal opcode or opcode extension that is unsupported; error code of "3" indicates an illegal parameter offset (e.g., exceeding chain buffer size of 1 KB); and additional errors such as, command chain time out indicating the execution exceeds a present time frame, DMA error (indicating illegal arguments, time outs, etc.), illegal memory or register access (wherein the processor tries to access an address that is not mapped to a physical register or memory, or to a protected address.

In one embodiment, the host system/processor is able to provide additional information to help with error recover and debugging via the response block. For example, a list of commands that executed successfully can be returned (e.g., via bitmap), or providing a core dump (e.g., save a copy of relevant internal processor state to a DRAM buffer).

Certain commands copy data from the host system/processor to the FPGA memory (e.g. SET), or vice versa. As part of the command execution, the host system/processor will program one of the SMC controller DMA engines to perform the data transfers. The DMA operation is allowed to proceed asynchronously while the remaining commands in the chain continue to execute, unless a fence command or a RET is encountered. That will force the chain to wait for the DMA transfer to complete before proceeding further.

In one embodiment, the plurality of primitive operations are stored in a separate location as a command chain. As such, the command chain comprises a program operable for re-execution in response to another high level memory command from the client system. Each time a high level command is presented for execution, a corresponding set of parameters is also provided for re-execution thereof by the command chain.

Figure 10:
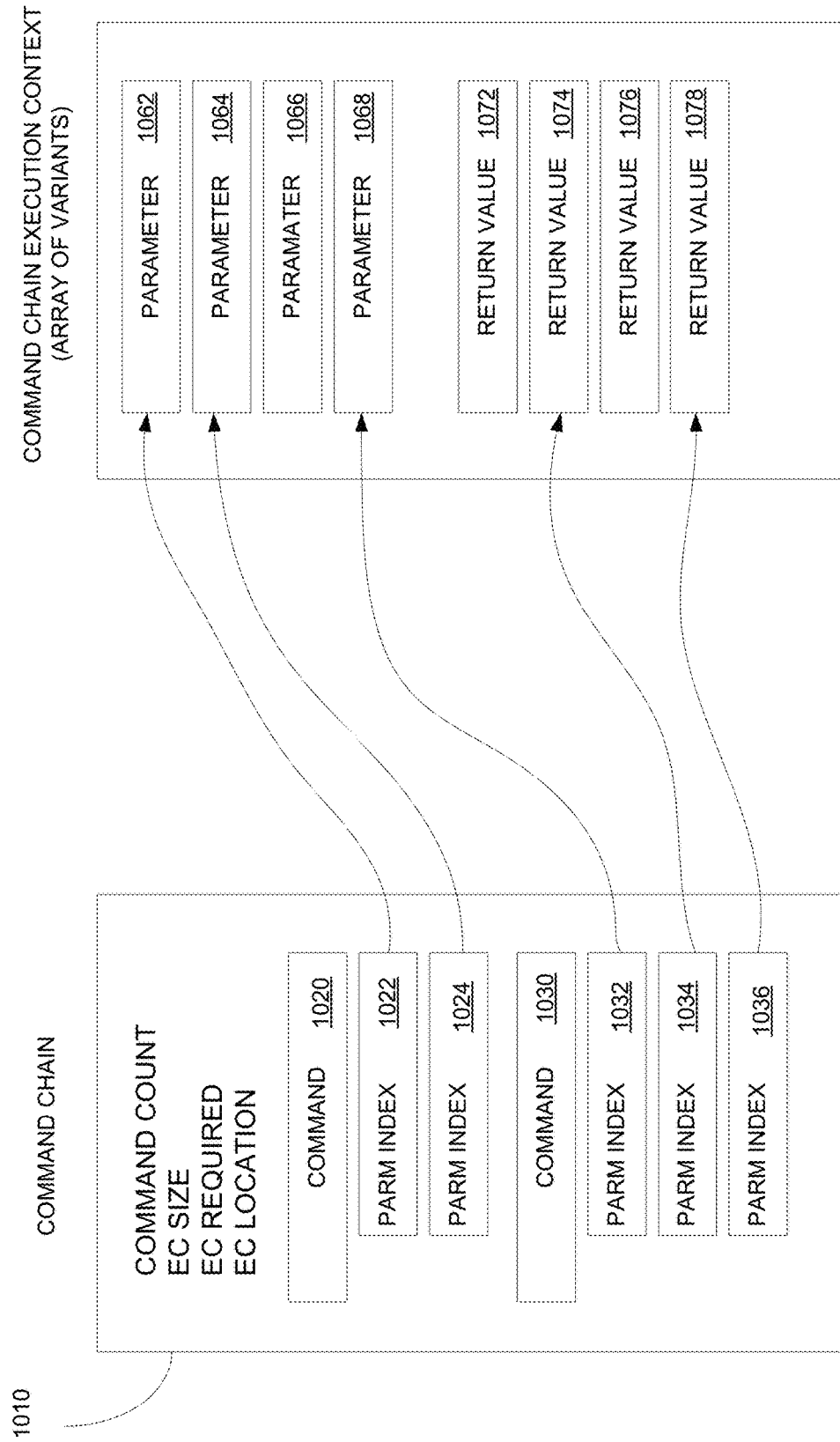
FIG. 10 is an illustration of a command chain and its array of variants, in accordance with embodiments of the present disclosure.

In various embodiments, command chains offer the opportunity for application developers to minimize queue and command round trips by combining multiple commands to be executed as a group before returning the results from the last command in the chain. For example, a single round-trip to the FPGA could combine multiple command primitives into compound operations on the FPGA. FIG. 10 illustrates a command chain 1010 that includes multiple commands 1020 and 1030, wherein the commands in the command chain 1010 are executed by a corresponding FPGA in an SMC. The command chain 1010 can be executed by one or more components of the computer system 1700 (e.g., processor 1714), storage system 1800 (e.g., server 1845), and memory appliance systems 100A-B (e.g., processor 112, SMC controller 141, etc.) and 600A (e.g., processor 625, SMC controller 641A, etc.) of FIGS. 1A-B, 6A, 17, and 18, respectively.

As shown in FIG. 10, command 1020 in command chain 1010 includes one or more parameter indices, such as indices 1022 and 1024. For example, parameter index 1022 is used to access parameter 1062, and index 1024 is used to access parameter 1064. In addition, command 1030 in command chain 1010 includes one or more parameter indices, such as indices 1032, 1034, and 1036. For example, parameter index 1032 is used to access parameter 1068. In addition, parameter index 1034 is used to access a return value 1074 resulting from a previous command (e.g., command 1020) in the chain 1010. Also, parameter index 1036 is used to access return value 1078.

More particularly, FIG. 10 is an illustration of command chain 1010 and its array of variants, in accordance with embodiments of the present disclosure. A significant aspect of command chains is how parameters are defined and passed between commands in the chain. The command chain execution begins in the context of a "parameter space" which can include the parameters passed in by the chain's author. Command chains can be accompanied by parameters for each command in the chain inclusive of a parameter type that supports binding of parameters to return values from previous commands in the chain. Parameters are passed as arrays of type variant_t. Variants types include variant type known as a "REFERENCE" which contains an encoded reference to any variant in the execution context. Each command in the chain has a deterministic number of return values so reference offsets into the execution context can be computed in advance of the actual execution of the chain. In this way, command chains can be constructed in a way that both immediate parameters supplied by the caller and values yielded by command execution can be used to parameterize subsequent commands.

In embodiments, multiple commands are enqueued with embedded fields indicating where a chain begins and ends. In another embodiment, a single command is enqueued, which contains a pointer to a command-chain+parameters that should be executed prior to returning, which is similar to a procedure call.

In embodiments, when creating command-chains, commands are accompanied by array variants representing the command-chain execution context. For example, this is similar to a global stack. Command-chain input parameters can be pre-staged in the execution context. Each command contains an array of indices into the execution context corresponding to each of the required parameters for the command. Command execution yields a deterministic number of return values which are appended to the execution context as each command executes. This can allow for input parameters to a command to include the pre-staged parameters (e.g., 1062, 1064, 1066, and 1068) or the subsequent return values (e.g., 1072, 1074, 1076, and 1078). In some implementations, only the first command in the chain is limited to using pre-staged parameters in its execution.

In embodiments, command chains are a variable-length array of commands+parameter indices. The indices represent offsets into the execution context. Decoupling command-chains from their execution context can allow for command chains to then be pre-staged in device memory and entire chains can be enqueued "by reference"—meaning that rather than enqueue the chain a reference to a preconstructed chain in device memory can be enqueued. Furthermore, decoupling the execution context can allow for a single command chain to be executing multiple times in parallel so long as the execution context per thread is unique. This capability allows for performing multi-object operations within the SMC because entire arrays of execution contexts can be constructed by the application and manipulated in parallel. In embodiments, command chains contain both the length of the execution context (sizeof(variant)*# of parameters), and also include information on the total space required during execution (e.g. sizeof(variant)*(parameter count+return value count)).

An example of a command chain is illustrated in a SET operation for a hashtable, which involves selecting a hash-bucket (i.e., a specific LIST), and then utilizing the following command chain of operations: ALLOC->INCR_REF-COUNT->BLOB_WRITE_DATA->LIST_APPEND->LIST_APPEND (The first LIST_APPEND adds it to the chosen hash bucket while the second LIST_APPEND adds it to the LRU list).

Memory Packet, Data Structure and Hierarchy within a Memory Appliance Architecture Embodiments of the present disclosure provide for reconfigurable memory structure implemented within a memory appliance architecture including programmable memory interfaces for accessing memory. Implementation of the memory structure is achieved through a content-aware memory controller which comprehends logical data structure and not memory raw bits. The reconfigurable memory structure in embodiments of the present disclosure is implementable within the systems and flow diagrams described in FIGS. 1-10. For example, the memory appliances and systems 100A-B, 200, 310, 600A of FIGS. 1A-B, 2, and 6 are configured to receive high level instructions from a client system and translate those instructions into lower-level primitive operations that are formatted for execution by a plurality of SMC controllers on the reconfigurable memory structure, wherein each SMC controller is configured to manage corresponding memory devices.

Embodiments of the present disclosure provide for a memory appliance that includes a processor and a plurality of SMCs, wherein each SMC includes a plurality of memory devices, and an SMC controller for independently controlling the management of one or more groupings of memory within a plurality of memory devices of a corresponding SMC. The memory appliance is configured to receive high level instructions from a client system, and to translate the instructions into lower-level assembly code style primitive operations that are executable by the plurality of SMC controllers on the reconfigurable memory structure to produce a result. In particular, each of one or more SMCs includes a hardware based memory controller and memory. The memory controller may be programmable (e.g., FPGA) or include static functionality (e.g., ASIC) to controller the management of a plurality of memory devices contained in the memory. The primitive commands include data manipulation instructions formatted for operation on the items of data accessed by the SMC controller through one or more data structures stored in the device memory. In particular, the set of data structures are configurable to be comprehended by the SMC controller, upon which various primitive operations can be performed. That is, the controller is configured to respond to primitive commands configured to access content stored in one or more of the plurality of memory devices, and to perform data operations on content accessed from the plurality of memory devices. For example, the data structure organizes chunks of memory into discontinuous "collections" that are comprehended and operable by the SMC controller.

The memory controller is data structure aware such that the controller is configured to traverse the memory structure and perform operations on the memory structure based on metadata and relationship information. Specifically, the content-aware memory controller comprehends the logical data structure rather than the raw bits without taking the logical data structure into account. In particular, the command-set of primitive operations is configured to expose a set of functionality, higher-level than simple loads and stores, upon which much more sophisticated functionality is built. For example, the memory structure includes variably sized containers that are arranged in relational configurations. In one embodiment, the relationship is defined by lists, which provide a building block for many other data structures and functionality (e.g., heap managers, queues, trees, graphs, etc.). As such, supporting basic list operations can offer a basic capability onto which richer applications are built. For instance, a primitive command as executed by the controller is configured to perform a management operation on the plurality of containers defined within the memory structure. For example, a management operation may include adding a list, modifying a list, deleting a list, etc. In another instance, a primitive command is configured to perform on raw memory within the memory structure. In still another instance, the primitive command is configured to perform a management operation on the relationship information.

Figure 11A:
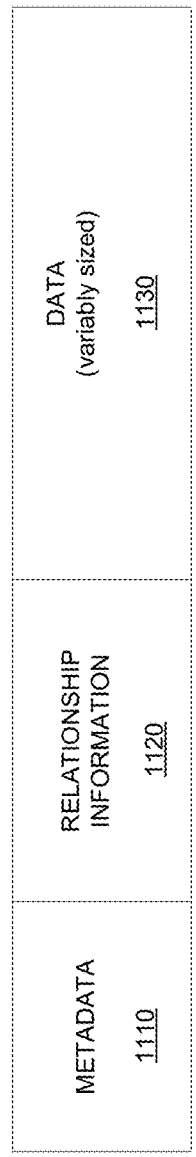
FIG. 11A is an illustration of a data packet used within a reconfigurable memory structure implemented within a memory appliance architecture including programmable memory interfaces for accessing memory, in accordance with one embodiment of the present disclosure.

FIG. 11A is an illustration of a data packet or container 1100A used within a reconfigurable memory structure implemented within a memory appliance architecture including programmable memory interfaces for accessing memory, in accordance with one embodiment of the present disclosure. The container 1100A includes data. As shown, the container 1100A is configurable to be comprehended by a corresponding SMC controller, upon which various primitive operations can be performed, in accordance with one embodiment of the present disclosure. Container 1100A is stored in device memory of the memory appliance, previously described (e.g., memory appliances and systems 100A-B, 200, 310, 600A of FIGS. 1A-B, 2, and 6), wherein the reconfigurable memory structure comprises multiple and variably sized containers. That is, within a reconfigurable memory structure, containers 1100A are variably sized, such that one container may be of a different size than another container. As shown, the data packet 1100A includes a payload 1130 of data (variably sized), metadata 1110, and relationship information 1120 (variably sized).

Metadata 1110 includes information specific to container 1100A, wherein metadata 1110 is a fixed potion of container 1100A. For example, metadata 1110 includes information, such as: total_length or length of the container; list_count illustrating the number of lists the container is a member of; data_length illustrating the length of the data portion; access_time indicating when the container was last accessed; create-time indicating when the container was created; reference_count; flags; etc.

Relationship information 1120 provides information that associates a corresponding container 1100A with one or more other containers that are stored in the memory structure. In that manner, the relationship information in a plurality of containers defines the memory structure. The memory structure is reconfigurable since any change in the relationship information in any of the containers will affect and change the overall memory structure. The relationship information allows the controller to traverse the memory structure.

The payload 1130 contains data specific to the container 1100A. Because the length of the data can be defined, the memory structure includes a plurality of variably sized containers. As such, a first container may include data of a first length, while a second container may include data of a second length.

In one embodiment, memory management revolves around the concepts of "blobs" as containers, and "lists" providing relationship information. A "blob" is a fixed-size chunk of device memory that carries with it certain metadata (e.g., last access time, creation time, etc.) as well as a variable array of "list entries" which facilitate its membership in one or more "lists". Lists are traditional singly or doubly linked lists of blobs. In particular, the SMC controller is configured to walk and modify lists in a thread-safe way in response to the invocation by the processor of various list primitives.

Each blob contains an array of "listentries" which represent a given blob's membership in various lists. Those lists may include additional blobs. Further, a blob can exist in multiple lists simultaneously. SMC controllers comprehending the list and blob structures, can link, unlink, prepend or append as well as search and find items within a list based on very rudimentary selection criteria.

The SMC controller will expose a set of list, blob, and raw memory primitives that can be invoked by enqueing a command block (command+parameters) to a queue. In addition to enqueing individual commands, command-chains can be enqueued. Command-chains are variable length arrays of command blocks for which the output of each command is passed to the subsequent command as a parameter. Command-chains facilitate the design goal of minimizing round-trips and queuing latency by allowing compound operations to be constructed and performed with a single command/response round trip to the SMC controller.

In one embodiment, various primitive operations will increment and decrement reference counts associated with each blob. Some primitive operations are only valid for unreferenced blobs (e.g., free) advertisement may logically "succeed" but are only committed once the reference count goes to "0". The specific case for this behavior is when a blob is in use for I/O but has been freed by the user-mode application. When the I/O completes and the reference count goes to zero, then the blob can only be added back to the free list.

Figure 11B:
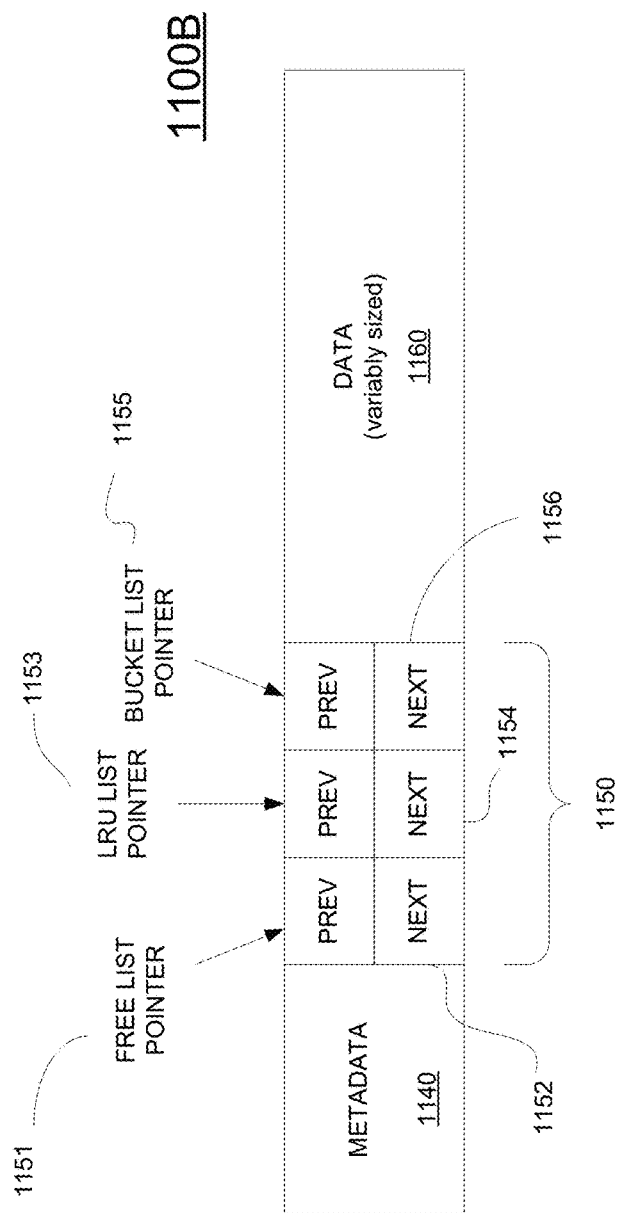
FIG. 11B is an illustration of a data packet used within defined reconfigurable Memcached memory structure implemented within a memory appliance architecture including programmable memory interfaces for accessing memory, in accordance with one embodiment of the present disclosure.

FIG. 11B is an illustration of a data packet and/or container 1100B used within a reconfigurable Memcached memory structure implemented within a memory appliance architecture including programmable memory interfaces for accessing memory, in accordance with one embodiment of the present disclosure. Container 1100B is a specific implementation of the generic container 1100A shown in FIG. 11A, wherein container 1100B is implemented within a Memcached memory structure. As shown, the container 1100B is configurable to be comprehended by a corresponding SMC controller, upon which various primitive operations can be performed, in accordance with one embodiment of the present disclosure. Container 1100B is stored in device memory of the memory appliance, previously described (e.g., memory appliances and systems 100A-B, 200, 310, 600A of FIGS. 1A-B, 2, and 6), wherein the reconfigurable memory structure comprises multiple and variably sized containers. In particular, container 1100B includes metadata 1140, relationship information 1150, and a payload 1160 containing data.

In the example of a blob container (for example as implemented within a Memcached memory structure), a blob is a contiguous memory region (e.g., allocated from a heap). A memory slab is a collection of blobs of equal size.

As such, the reconfigurable memory structure includes containers (e.g., blobs) that are part of one or more lists, which is defined in the relationship information. That is, the relationship information 1150 may include one or more list entries, which provide membership of the data in the payload into one or more lists, and/or a link or pointer to the data. For example, a listentry exposes an item of data in a corresponding list. Free, LRU, and hash bucket are examples of lists. Container 1100B may be part of a classification of containers, which is defined by a free list. The free list pointer 1151 points to a previous container in the same classification. The free list pointer 1152 points to the next container in the same classification. The LRU pointer 1153 points to the previous container in the LRU list, and LRU pointer 1154 points to the next container in the LRU list. The bucket list pointer 1155 points to the previous entry in a bucket list, such as one defining the first container in a list of related containers. The bucket list pointer 1156 points to the next entry in the bucket list.

Figure 12:
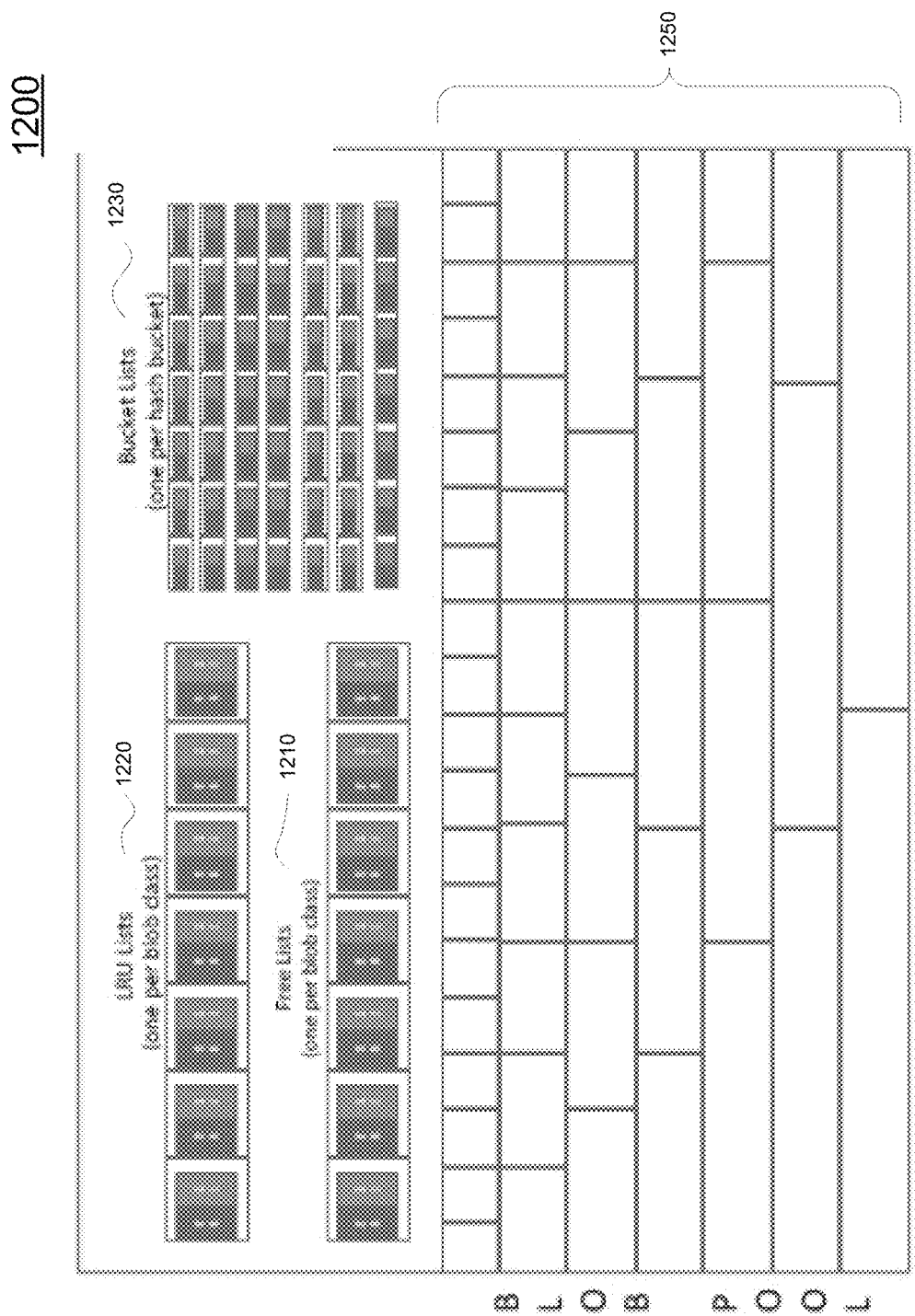
FIG. 12 is an illustration of a reconfigurable Memcached memory structure, in accordance with one embodiment of the present disclosure.

FIG. 12 is an illustration of a reconfigurable Memcached memory structure 1200, in accordance with one embodiment of the present disclosure. The widespread use of distributed key/value stores as a way to exploit large pools of network attached memory makes Memcached suitable for implementation in the reconfigurable memory structure. The Memcached memory structure provides for a network-based service for storing and retrieving values associated with text-based keys, wherein keys can be up to 250 bytes in length, and their associated values can be up to 1 megabyte, in one implementation. For example, the Memcached memory structure 1200 may include a plurality of containers described in FIGS. 11A-B, wherein the each container includes relationship information relating a corresponding container to other containers. In addition, the containers and/or data included within the Memecached memory structure 1200 may be manipulated by the memory appliances and systems 100A-B, 200, 310, 600A of FIGS. 1A-B, 2, and 6.

In particular, FIG. 12 illustrates how the data for a Memcached implementation might be organized on top of the kind of command primitives using data structures previously described (e.g., such as data structures managed by memory appliances and systems 100A-B, 200, 310, 600A of FIGS. 1A-B, 2, and 6), wherein Memcached provides a network-based service for storing and retrieving values associated with text-based keys, in accordance with one embodiment of the present disclosure. On startup, an implementation of Memcached would compute a sea of pointers representing addresses in device memory that reflect the division of memory into smaller pools of varying sized objects along with space reserved for the list arrays needed for the requisite Memcached functionality.

Objects in Memcached exist in one and sometimes two lists. These objects are taken from a pool 1250, such as a pool of variably sized blobs or containers. Initially, all objects exist in an array of free lists 1210, each free list holding all objects of a given size (e.g., a particular class). Free lists 1210 are used to satisfy allocation requests in response to SET operations in the cache. During processing of a SET, an object is plucked from the free list for the appropriately sized object, and inserted into two other lists. First, a hash for the key is computed and used to select a list from an array of lists 1230, wherein each entry in the array commonly referred to as a "bucket". The object is inserted into the list chosen for the given hash, and then inserted into a doubly-linked list called the LRU list 1220. The LRU list 1220 is used very much like a queue (e.g., the oldest entry is the one returned to the allocation pool, i.e. FIFO). The list can be walked backwards from the tail to go from oldest to youngest or forward from the head to go from youngest to oldest. In satisfying new object allocation requests, Memcached walks a few nodes in the list from oldest to youngest to see if any objects in the cache have expired before abandoning the LRU list in favor of satisfying the allocation request from the appropriate free list.

During Memcached initialization, the MWRITE primitive command would provide a way to initialize large numbers of empty blobs with a very small number of round-trips from host to device. The FILL command would facilitate array initialization for setting up the requisite list arrays.

The host application would maintain pointers to device memory representing the various lists required to implement the needed functionality. Using pointers to lists and blobs in device memory (e.g., stored in the meta-fields of FIGS. 11A-B), the computed blob pointers would be added to the various free lists on startup while the head and tails of the bucket and LRU lists would be initialized to NULL.

On processing a SET command, the host would enqueue an ALLOC command passing the LIST pointer for the pre-constructed list containing blobs of the appropriate size. Using the blob pointer returned by ALLOC, the host would enqueue a BLOB_WRITE_DATA command to initialize the allocated blob, and LINK commands for the relevant LRU and bucket lists. To minimize round-trips through the queue, the ability to enqueue command chains would allow the host to construct a chain of ALLOC->BLOB_WRITE_DATA->LINK->LINK with the BLOB returned by each command passed in as the input blob to the following command in the chain. Command chains allow for reduced queuing latency and simplify the implementation of operations encompassing multiple primitives.

On processing a GET command, the host would compute a hash and enqueue a SELECT command, having constructed a CRITERIA that compares the requested key for equality. Alternatively, the SMC controller could implement the hash function and fully automate the selection of a bucket list and subsequent key comparisons.

Figure 13:
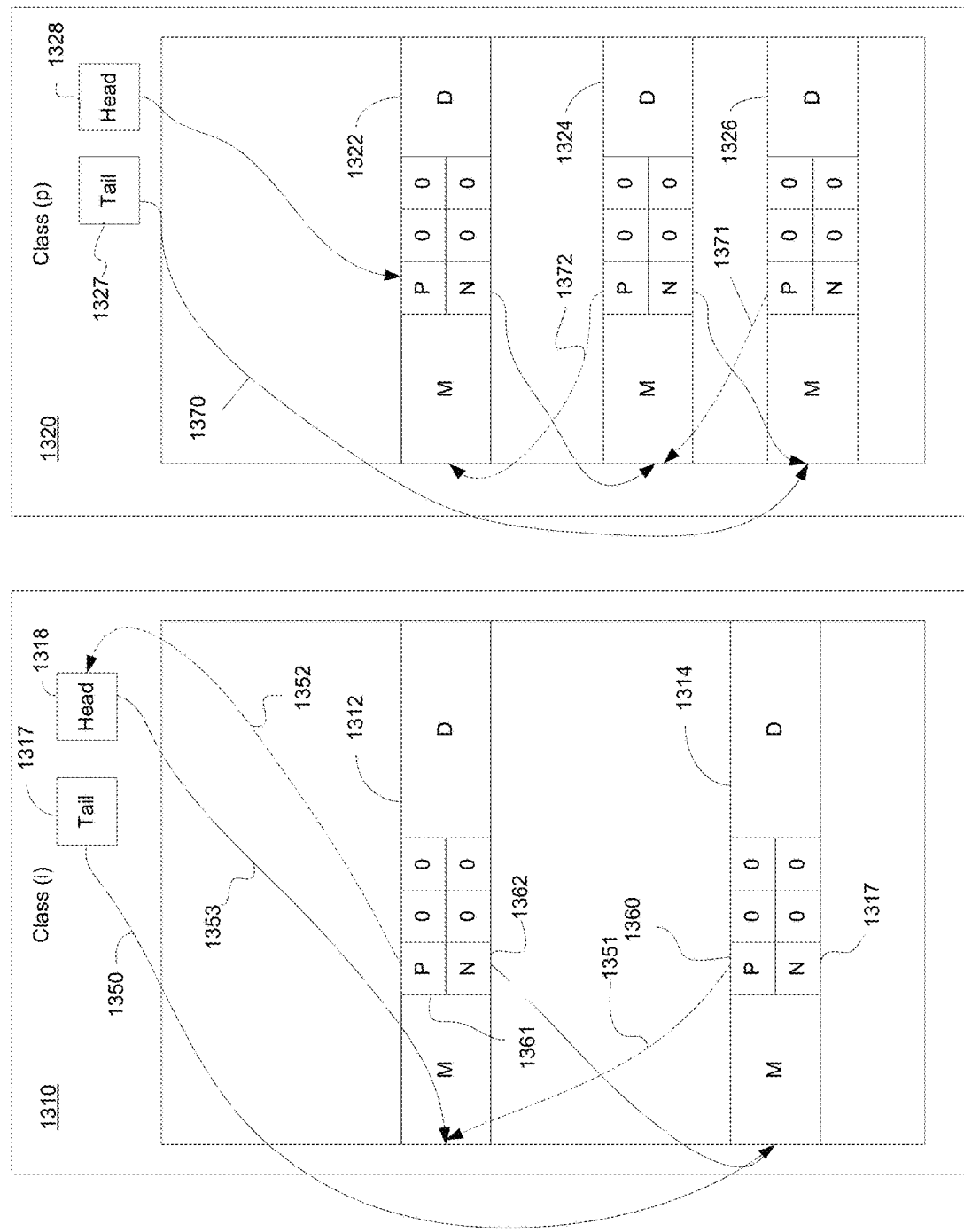
FIG. 13 is an illustration of the classifications of variably sized containers within free lists, in accordance with one embodiment of the present disclosure.

FIG. 13 is an illustration of the classifications of variably sized containers within free lists, in accordance with one embodiment of the present disclosure. For example, a memory structure may include two classes of containers (e.g., blobs). The first class (i) is defined in a free list 1310 that includes container 1312 and 1314. A second class (p) is defined in free list 1320, and includes containers 1322, 1324, and 1326. As shown, containers in class (i) are of a first size, and containers in class (p) are of a second size, wherein the sizes are different to accommodate varying sized of data. In order to manage the allocation of containers within a memory structure, containers can be ordered and listed in free lists (e.g., 1310 and 1320) within a classification so that each is available for inclusion within other linked lists of the memory structure. For example, an available container within free list 1310 may be allocated to a linked list of related containers, at which point that container is removed from the free list. The variably sized containers may be implemented within Memecached memory structure 1200 of FIG. 12. In addition, the containers included within the free lists 1310 and 1320 may be implemented by the memory appliances and systems 100A-B, 200, 310, 600A of FIGS. 1A-B, 2, and 6.

The free list 1310 for class (i) can be walked backwards from the tail 1317 to the head 1318. The containers may be listed from oldest to youngest, or youngest to oldest. For instance, when walking from tail 1317 along path 1350 towards the head 1318, container 1314 is next. From container 1314, the previous pointer 1360 points to container 1312 along path 1351. Again, from container 1312, the previous pointer 1361 points to head 1318, along path 1352. Similarly, the class (i) can be walked from head 1318 to tail by following path 1353 to container 1312. The next pointer 1362 points to container 1314. In container 1314, the next pointer 1363 will point to the tail 1317.

Similarly, the free list for 1320 for class (p) can be walked backward from the tail 1327 to head 1328. For instance, when walking from tail 1327 along path 1370 toward head 1328, container 1326 is next. From container 1326, the previous pointer points to container 1324 along path 1371. From container 1324, the previous pointer points to container 1322 along path 1372. In container 1322, the previous pointer will point to the head 1328.

Figure 14:
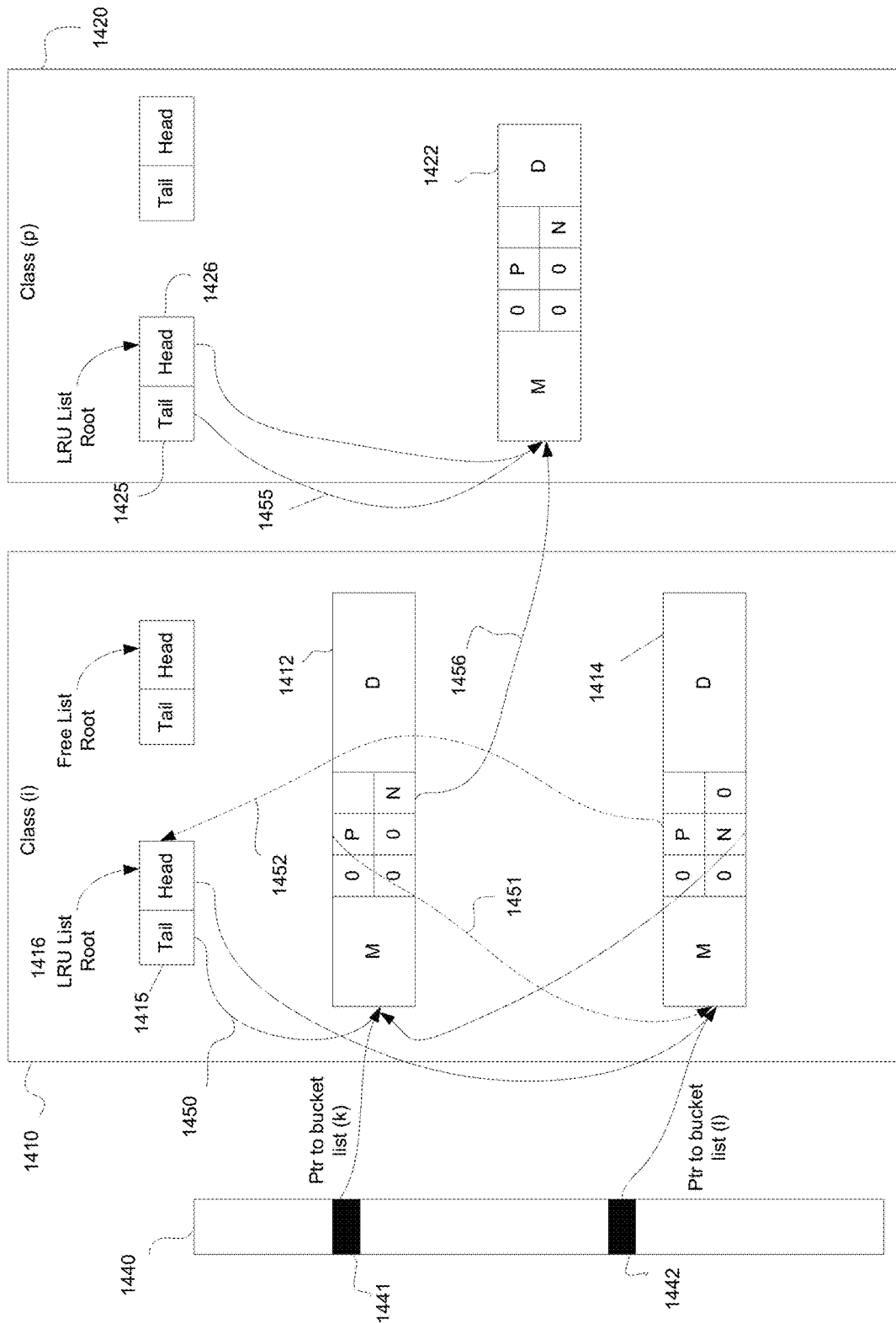
FIG. 14 is an illustration of the LRU container lists within classifications of variably sized containers within free lists, in accordance with one embodiment of the present disclosure.

FIG. 14 is an illustration of LRU container lists within classifications of variably sized containers within free lists (e.g., free lists of FIG. 13), in accordance with one embodiment of the present disclosure. For example, a memory structure may include two classes of containers (e.g., blobs). The first class (i) includes container 1412 and 1414. A second class (p) includes container 1422. As shown, containers in class (i) are of a first size, and containers in class (p) are of a second size, wherein the sizes are different. In order to manage the containers within a memory structure, containers in a free list of a classification may be ordered such that the last recently used container is known. In that manner, containers in a free list may be ordered by use over a period, such that the oldest containers may be allocated before newer containers in the free list. The variably sized containers by class may be implemented within Memecached memory structure 1200 of FIG. 12. In addition, the containers included within the lists 1410 and 1420 may be implemented by the memory appliances and systems 100A-B, 200, 310, 600A of FIGS. 1A-B, 2, and 6.

When walking the containers in class (i) from tail 1415 to head 1416, container 1412 is next following path 1450, then container 1414 along path 1451 from the previous pointer, and then to head 1416 along path 1452 from the previous pointer. Similarly, when walking the containers in class (p) from tail 1425 to head 1426, container 1422 is next. Since there is only one container in class (p), the previous pointer in container 1422 will point to head 1426.

In addition, in the Memcached implementation of the memory structure, a key is hashed and matched to one of the values in the hash list 1440. For example, a key (of a key-value pair stored in the data portion of a container) that is hashed may be represented by hash 1441. That hash 1441 points to a bucket list (k). The hash value 1441 includes a pointer to the first entry in the bucket list (k), which is container 1412. From the relationship information in container 1412, the next bucket list pointer leads to container 1422 in class (p) along path 1456. In that manner, the keys in the data portion of containers 1412 and 1422 can be matched with the original key (or their hashes can be matched) to determine which container, if any, belongs to the originally presented key. A similar process may be followed to determine if any containers belong to a key that hashes to hash 1442 in the list 1440.

Figure 15:
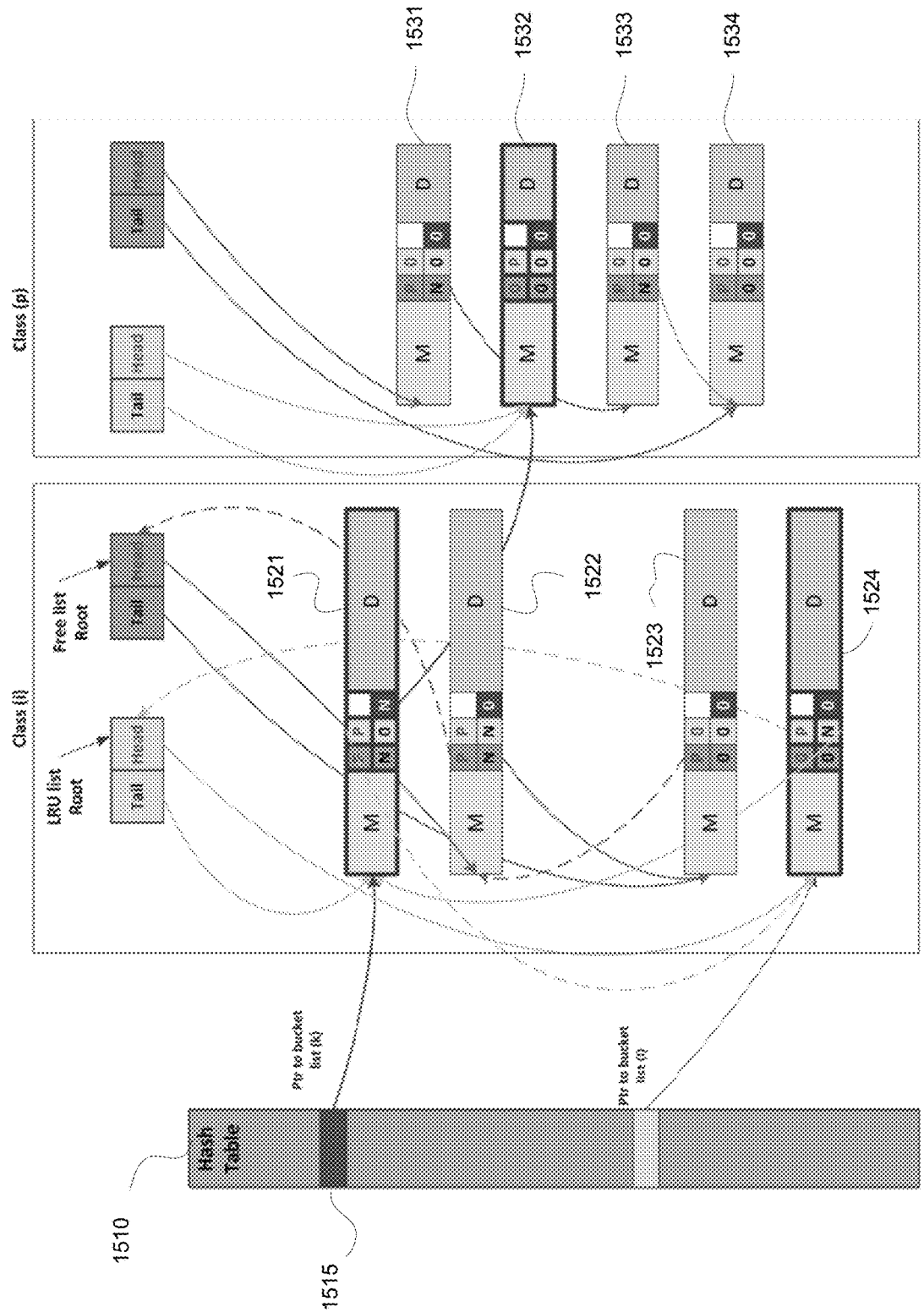
FIG. 15 is an illustration of a combination of free lists and LRU lists within classifications of variably sized containers, in accordance with one embodiment of the present disclosure.

FIG. 15 is an illustration of a combination of free lists and LRU lists within classifications of variably sized containers, in accordance with one embodiment of the present disclosure. In addition, the containers are organized within a Memcached memory structure. For example, a memory structure may include two classes of containers (e.g., blobs). The first class (i) is defined in a free list that includes four containers 1521-1524. A second class (p) is defined in a free list that includes four containers 1531-1534. As shown, containers in class (i) are of a first size, and containers in class (p) are of a second size, wherein the sizes are different. In order to manage the containers within a memory structure, containers in classification list may be related such that the last recently used container is known, and free containers are known. The variably sized containers by class may be implemented within Memecached memory structure 1200 of FIG. 12, for example. In addition, the containers included within the lists 1410 and 1420 may be implemented by the memory appliances and systems 100A-B, 200, 310, 600A of FIGS. 1A-B, 2, and 6.

In addition, the hash table 1510 allows for keys to be linked to a proper container, and one or more of its associated containers. This is accomplished by walking the bucket list to match keys in containers of the bucket list (e.g., list k) to the originally presented key. For example, bucket list k from hash value 1515 includes containers 1521 and 1532.

Figure 16:
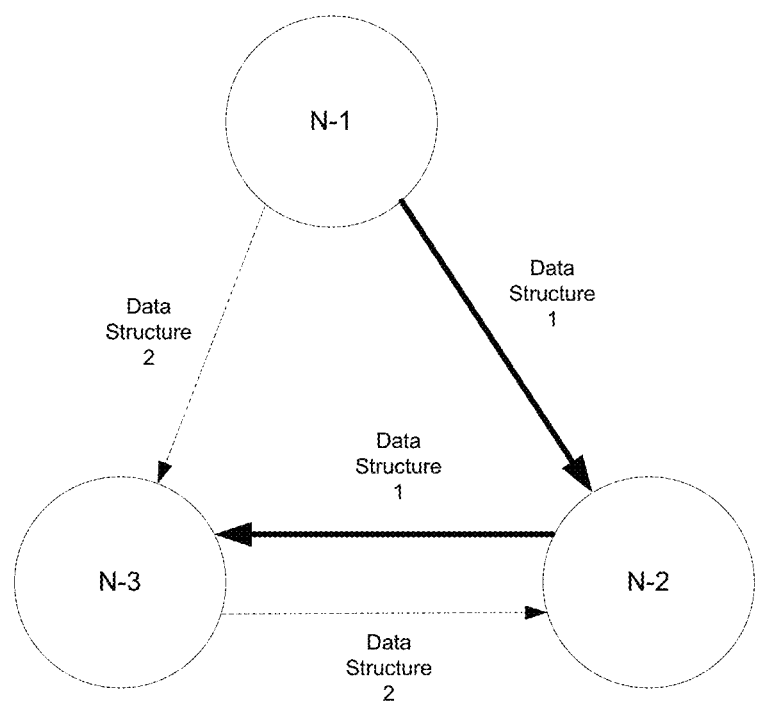
FIG. 16 is an illustration of two memory structures based on the same set of containers within a memory appliance architecture including programmable memory interfaces for accessing memory, in accordance with one embodiment of the present disclosure.

FIG. 16 is an illustration of two memory structures based on the same set of containers 1600 within a memory appliance architecture including programmable memory interfaces for accessing memory, in accordance with one embodiment of the present disclosure. That is, in one memory appliance, depending on how relationships are defined between containers stored in the memory appliance, there may be multiple data structures, such as data structure 1 and data structure 2 shown in FIG. 16. For example, the set of containers includes containers N-1 through N-3. Depending on how these containers are arranged (e.g., as defined by their relationships) multiple memory structures can be defined. That is, by performing an operation on the relationship information of any of the containers in the set 1600, the memory structure is reconfigured. Though the data structures are shown having three containers, it is understood that data structures 1 and 2 may contain any number of variably sized containers, and that the total number of containers may be different in each of the data structures 1 and 2. In that manner, the memory appliance is reconfigurable depending on the defined relationships between containers N-1 through N-3, for example. The memory structures (e.g., data structures 1 and 2) may be implemented by the memory appliances and systems 100A-B, 200, 310, 600A of FIGS. 1A-B, 2, and 6.

For example, data structure 1 includes all three containers N-1, N-2, and N-3, but is defined as having a structure that has container N-1 preceding container N-2, and wherein container N-2 precedes container N-3. For example, the relationship information may define a list and the orders of containers within the list.

In addition, data structure 2 includes all three containers N-1, N-2, and N-3, just as data structure 1. However, data structure 2 is configured differently from data structure 1, and is defined as having a structure with container N-1 preceding container N-3, and wherein container N-3 precedes container N-2.

Data Structures, Types, and Commands

As previously described, low-level memory primitives supporting read and write operations on absolute device memory addresses is supported by the SMC controller to allow the overall memory management required to facilitate the creation and manipulation of key global data structures. The SMC controller supports the allocation of variable-length blobs and their association with various device-based collections in the form of lists. Lists are an enabling vehicle for generalized slab management and free lists, hash tables, queues, command chains, etc. Applications that create blobs can be configured to explicitly anticipate the maximum number of lists that a blob will be a member of, concurrently, during its life time. Each blob contains a variable sized "listentry" array to accommodate list memberships. All blobs contain at least one listentry for use by the slab manager.

In that manner, the primitive commands comprise data manipulation instructions formatted for operation on data stored in linked lists within the device memory. For example, the instructions may include operations configured for accessing data of a linked list; searching data of a linked list; modifying data of a linked list; adding data items to a linked list; and removing data items from a linked list.

A list of commands used to facilitate discovery of SMC resources is provided. For example, an attributes structure containing application relevant SMC information (e.g., starting device address of available memory, size of available memory, etc.) is populated in response to the SMC ATTRS command. Various exemplary primitive commands are listed below.

The "READ<SRC, DST, LENGTH>" primitive command copies an entry from device memory into system memory over a specified length. The "SRC" term defines the device source address. The "DST" term defines the system memory destination address. The "LENGTH" term defines the data length (e.g., in bytes) that are copied. The "READ" primitive command is implementable on containers 1100A-B and within memory structure 1200 of FIGS. 11A-B and 12, and on containers included within lists of FIGS. 13-15.

The "WRITE<SRC, DST, LENGTH>" primitive command copies from system memory to device memory over a specified length. Again, the SRC" term defines the device source address. The "DST" term defines the system memory destination address. The "LENGTH" term defines the data length (e.g., in bytes) that are copied. The "WRITE" primitive command is implementable on containers 1100A-B and within memory structure 1200 of FIGS. 11A-B and 12, and on containers included within lists of FIGS. 13-15.

The "LREAD<LIST, OFFSET, LENGTH, DST>" command reads data from a list, wherein the list is a continuous or contiguous block of memory. For example, the memory controller walks the list to fulfill the request. The term "LIST" points to a list in the device memory. The "LREAD" primitive command is implementable on containers 1100A-B and within memory structure 1200 of FIGS. 11A-B and 12, and on containers included within lists of FIGS. 13-15.

The "LWRITE<SRC, LIST, OFFSET, LENGTH>" primitive command writes data to a list, wherein the list is a continuous or contiguous block of memory. For example, the memory controller walks the list to fulfill the write request. The term "SRC" defines the source address in system memory. The term "LIST" points to the list in device memory. The term "OFFSET" provides for seeking the location across the list of blobs. The term "LENGTH" defines the length of data to be copied. The "LWRITE" primitive command is implementable on containers 1100A-B and within memory structure 1200 of FIGS. 11A-B and 12, and on containers included within lists of FIGS. 13-15.

The "READFIELDS<*BLOB, COUNT, FIELDID, DST>" primitive command reads a specific blob metadata field into a system memory destination. This command can be performed across multiple blob objects. For example, this command can be used when performing various operations related to cache invalidation, garbage collection, etc. The term "BLOB" defines a system memory pointer to an array of blob pointers. The individual blobs point to device memory. The term "COUNT" defines the number of blobs pointed to by the BLOB array. The term "FIELDID" defines an enumerated value representing a specific metadata field to read. The term "DST" defines a destination buffer in system memory large enough to hold COUNT entries of the data type represented by FIELDID. The "READFIELDS" primitive command is implementable on containers 1100A-B and within memory structure 1200 of FIGS. 11A-B and 12, and on containers included within lists of FIGS. 13-15.

The "LREADFIELD<LIST, COUNT, FIELDID, DST>" command reads a specific field from each of the blobs in a list, and place the values continuously and/or contiguously in the DST. The term "LIST" defines a list pointer in device memory of the list to traverse for reading fields. The term "COUNT" defines the maximum number of fields that can be held by the DST buffer. The term "FIELDID" defines the field from each BLOB structure to be read. The term "DST" defines the destination buffer for writing data fields. The "LREADFIELD" primitive command is implementable on containers 1100A-B and within memory structure 1200 of FIGS. 11A-B and 12, and on containers included within lists of FIGS. 13-15.

The "WRITEFIELDS<*BLOB, COUNT, FIELDID, SRC>" command reads a specific blob metadata field into a device memory destination. This command is implementable across multiple blob objects. For example, this command can be used when performing various operations related to cache invalidation, garbage collection, etc. The term "BLOB" defines a system memory pointer to an array of blob pointers. The individual blobs point to device memory. The term "COUNT" defines the number of blobs pointed to by the BLOB array. The term "FIELDID" defines the enumerated value representing a specific metadata field to write. The term "SRC" defines the source buffer in system memory containing COUNT entries of the data type represented by FIELDID. This array is pre-populated with the values to be written to the BLOB(s) pointed to by the BLOB array, in one implementation. The "WRITEFIELDS" primitive command is implementable on containers 1100A-B and within memory structure 1200 of FIGS. 11A-B and 12, and on containers included within lists of FIGS. 13-15.

The "MREAD<COUNT, [SRC, DST, LENGTH]>" command is configured to perform multiple read operations, and copying data from device memory to system memory. The term "COUNT" defines the number of read operations being requested. The term "SRC" defines an array of device memory addresses representing the source addresses for the read operation. The term "DST" defines an array of system memory addresses representing the destination addresses into which data is copied. The term "LENGTH" defines an array of respective lengths for each of the read operations being specified. The "MREAD" primitive command is implementable on containers 1100A-B and within memory structure 1200 of FIGS. 11A-B and 12, and on containers included within lists of FIGS. 13-15.

The "MWRITE<COUNT, [SRC, DST, SIZE]*>" command performs multiple write operations, including copying data from system memory to device memory. The term "COUNT" defines the number of write operations being requested. The term "SRC" defines an array of system memory addresses representing the source addresses for the write operation. The term "DST" defines an array of device memory addresses representing the destination addresses into which data is copied. The term "LENGTH" defines an array of respective lengths for each of the write operations being specified. The "MWRITE" primitive command is implementable on containers 1100A-B and within memory structure 1200 of FIGS. 11A-B and 12, and on containers included within lists of FIGS. 13-15.

The "ALLOC<LIST>" command unlinks and returns the first blob in the list, increments the blob reference count, and touches the creation and access_time dates. The term "LIST" defines the list from which to allocate a blob. The term "COUNT" defines the number of items left in the list. The "ALLOC" primitive command is implementable on containers 1100A-B and within memory structure 1200 of FIGS. 11A-B and 12, and on containers included within lists of FIGS. 13-15.

The "PREPEND<LIST, BLOB, INDEX>" inserts a blob at the beginning of a list. The term "LIST" is a pointer to a list in device memory into which the BLOB should be prepended. The term "BLOB" is a pointer to a blob in device memory to prepend into the LIST. The term "INDEX" is a listentry index in the BLOB to use for prepending. The "PREPEND" primitive command is implementable on containers 1100A-B and within memory structure 1200 of FIGS. 11A-B and 12, and on containers included within lists of FIGS. 13-15.

The "APPEND<LIST, BLOB, INDEX>" command appends a blob to the end of a list. The term "LIST" is a pointer to a list in device memory into which the BLOB should be appended. The term "BLOB" is a pointer to a blob in device memory to append into the list. The term "INDEX" is a listentry index in the BLOB to use for appending. The "APPEND" primitive command is implementable on containers 1100A-B and within memory structure 1200 of FIGS. 11A-B and 12, and on containers included within lists of FIGS. 13-15.

The "INSERT AFTER<LIST, BLOB1, BLOB2, INDEX>" command inserts BLOB1 after BLOB 2 in a list-LIST. The term "LIST" defines the list into which to insert BLOB1. The term "BLOB1" defines the blob to insert. The term "BLOB2 defines the blob after which to interest BLOB 1. The term "INDEX" defines the listentry index to use for inserting. The "INSERT AFTER" primitive command is implementable on containers 1100A-B and within memory structure 1200 of FIGS. 11A-B and 12, and on containers included within lists of FIGS. 13-15.

The "INSERT BEFORE<LIST, BLOB 1, BLOB2, INDEX>" command inserts BLOB1 before BLOB2 in LIST. The term "LIST" defines the list into which to insert BLOB1. The term "BLOB1" defines the blob to insert. The term "BLOB2" defines the blog before which to insert BLOB1. The term "INDEX" defines the listentry index to user for inserting. The "INSERT BEFORE" primitive command is implementable on containers 1100A-B and within memory structure 1200 of FIGS. 11A-B and 12, and on containers included within lists of FIGS. 13-15.

The "FREE<BLOB>" command will decrement a reference count and link a blob into its free list if ref==0. The command will return a reference count. The command uses the listentry (index 0) reserved for use by the slab manager. Using a reference counting model, it is possible that threads can hold references to blobs that have been "freed". In such a case, when the reference count is not 0 when FREE is invoked, the BLOB will only be added to the free list for subsequent allocation when the outstanding references are decremented by reference holders. Note that DECR_REFCOUNT can result in an implicit free operation. The term "BLOB" defines the blob to free. The "FREE" primitive command is implementable on containers 1100A-B and within memory structure 1200 of FIGS. 11A-B and 12, and on containers included within lists of FIGS. 13-15.

The "SELECT<LIST, CRITERIA, **BLOB, COUNT>" command returns all blobs from the LIST that meet the specified criteria, up to a maximum of COUNT. The fundamental idea is to facilitate multi-selection of blobs within a given list. Use-cases include rapidly identifying cache objects past their expiration date and key comparisons for exact matches in lists representing a specific hash bucket. The "SELECT" primitive command is implementable on containers 1100A-B and within memory structure 1200 of FIGS. 11A-B and 12, and on containers included within lists of FIGS. 13-15.

The "LINK<LIST, BLOB, INDEX>" adds a BLOB to a LIST in device memory. The command uses the specific listentry in the BLOB represented by INDEX. The term "LIST" defines the list pointer, in device memory, into which to insert the BLOB. The term "BLOB" defines the blob pointer, in device memory, to insert into the LIST. The term "INDEX" defines the listentry index in the BLOB to use for this LIST. The "LINK" primitive command is implementable on containers 1100A-B and within memory structure 1200 of FIGS. 11A-B and 12, and on containers included within lists of FIGS. 13-15.

The "UNLINK<LIST, BLOB, INDEX>" removes the BLOB from the LIST, clearing the next and previous pointers in listentry[INDEX]. The term "LIST" defines the pointer in device memory to list containing the blob to unlink. The term "BLOB" defines the pointer to device memory for the BLOB being unlinked. The term "INDEX" defines the listentry index to clear. The "UNLINK" primitive command is implementable on containers 1100A-B and within memory structure 1200 of FIGS. 11A-B and 12, and on containers included within lists of FIGS. 13-15.

The "DEFINE_LIST<ID,HEAD, TAIL" command will define various parameters for a list, including the identifier, head and tail. The "DEFINE" primitive command is implementable on containers 1100A-B and within memory structure 1200 of FIGS. 11A-B and 12, and on containers included within lists of FIGS. 13-15.

The "CONDITIONAL_UNLINK<LIST, CRITERIA, INDEX>" command defines an unlink operation on a particular list. The "CONDITIONAL" primitive command is implementable on containers 1100A-B and within memory structure 1200 of FIGS. 11A-B and 12, and on containers included within lists of FIGS. 13-15.

The "INCR_REFCOUNT<BLOB>" command increments the reference count associated with a blob. The "INCR_REFCOUNT" primitive command is implementable on containers 1100A-B and within memory structure 1200 of FIGS. 11A-B and 12, and on containers included within lists of FIGS. 13-15.

The "DECR_REFCOUNT<BLOB>" command decrements the reference count for BLOB and links the BLOB back into free list, if ref count goes to 0. Otherwise, the command returns a decremented reference count. The "DECR_REFCOUNT" primitive command is implementable on containers 1100A-B and within memory structure 1200 of FIGS. 11A-B and 12, and on containers included within lists of FIGS. 13-15.

The "MOVE_MEMBERSHIP<SRC LIST, DST LIST, BLOB, INDEX>" command moves membership of a blob between lists. The "MOVE" primitive command is implementable on containers 1100A-B and within memory structure 1200 of FIGS. 11A-B and 12, and on containers included within lists of FIGS. 13-15.

The "FILL<BYTE, DST, COUNT>" command fills device memory at DST address with BYTE for length of COUNT. The term "BYTE" defines the byte to fill the device memory with. The term "DST" defines the pointer to device memory where FILL operation begins. The term "COUNT" defines the number of bytes from DST over which is written the value of BYTE. The "FILL" primitive command is implementable on containers 1100A-B and within memory structure 1200 of FIGS. 11A-B and 12, and on containers included within lists of FIGS. 13-15.

The "BLOB_FILL<BLOB, BYTE>" command fills blob data with BYTE. The term "BLOB" points to device memory for this blob. The term "BYTE" defines the value to fill in BLOB's variable length data. The "BLOB_FILL" primitive command is implementable on containers 1100A-B and within memory structure 1200 of FIGS. 11A-B and 12, and on containers included within lists of FIGS. 13-15.

The "BLOB_WRITE_DATA<BLOB, SRC, LENGTH>" command overwrites blob data. The term "BLOB" points to device memory for this blob. The term "SRC" defines a pointer to system memory where data to be written resides. The term "LENGTH" defines the length of data to write. The "BLOB_WRITE" primitive command is implementable on containers 1100A-B and within memory structure 1200 of FIGS. 11A-B and 12, and on containers included within lists of FIGS. 13-15.

The "BLOB AND<BLOB1, BLOB2, BLOB DST>" command performs bitwise AND operation using BLOB1 and BLOB2 variable data storing result in BLOB_DST. The term "BLOB1" defines the first blob operation for bitwise AND operation. The term "BLOB2" defines the second blob operation for bitwise AND operation. The term "BLOB DST" defines the blob resulting from bitwise AND operation of BLOB1 and BLOB2. The "BLOB AND" primitive command is implementable on containers 1100A-B and within memory structure 1200 of FIGS. 11A-B and 12, and on containers included within lists of FIGS. 13-15.

The "BLOB OR<BLOB1, BLOB2, BLOB DST>" command performs bitwise OR operation using BLOB1 and BLOB2 variable data storing result in BLOB_DST. The term "BLOB 1" defines the first blob operation for bitwise OR operation. The term "BLOB2" defines the second blob operation for bitwise OR operation. The term "BLOB DST" defines the blob resulting from bitwise OR operation of BLOB1 and BLOB2. The "BLOB OR" primitive command is implementable on containers 1100A-B and within memory structure 1200 of FIGS. 11A-B and 12, and on containers included within lists of FIGS. 13-15.

The "BLOB XOR<BLOB1, BLOB2, BLOB DST>" command performs bitwise XOR operation using BLOB 1 and BLOB2 variable data storing result in BLOB_DST. The term "BLOB1" defines the first blob operation for bitwise XOR operation. The term "BLOB2" defines the second blob operation for bitwise XOR operation. The term "BLOB DST" defines the blob resulting from bitwise XOR operation of BLOB1 and BLOB2. The "BLOB XOR" primitive command is implementable on containers 1100A-B and within memory structure 1200 of FIGS. 11A-B and 12, and on containers included within lists of FIGS. 13-15.

The "BLOB COMPLEMENT<BLOB SRC, BLOB DST>" command performs bitwise 2-s complement operation on BLOB1 storing result in BLOB_DST. The term "BLOB1" defines the blob containing bits for NOT operation. The term "BLOB2" defines the resulting blob. The "BLOB COMPLEMENT" primitive command is implementable on containers 1100A-B and within memory structure 1200 of FIGS. 11A-B and 12, and on containers included within lists of FIGS. 13-15.

Portions of the detailed descriptions are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "receiving," "selecting," "storing," "loading," "reprogramming," "determining," "searching," "moving," "copying," "deleting," "identifying," "executing," "compiling," "providing," or the like, refer to actions and processes (e.g., flowcharts described herein) of a computer system or similar electronic computing device or processor (e.g., system 1710 of FIG. 17). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, FLASH memory, non-volatile memory or other memory technology, CD-ROM, DVDs or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, RF, infrared and other wireless media. Combinations of any of the above can also be included within the scope of computer-readable media.

Figure 17:
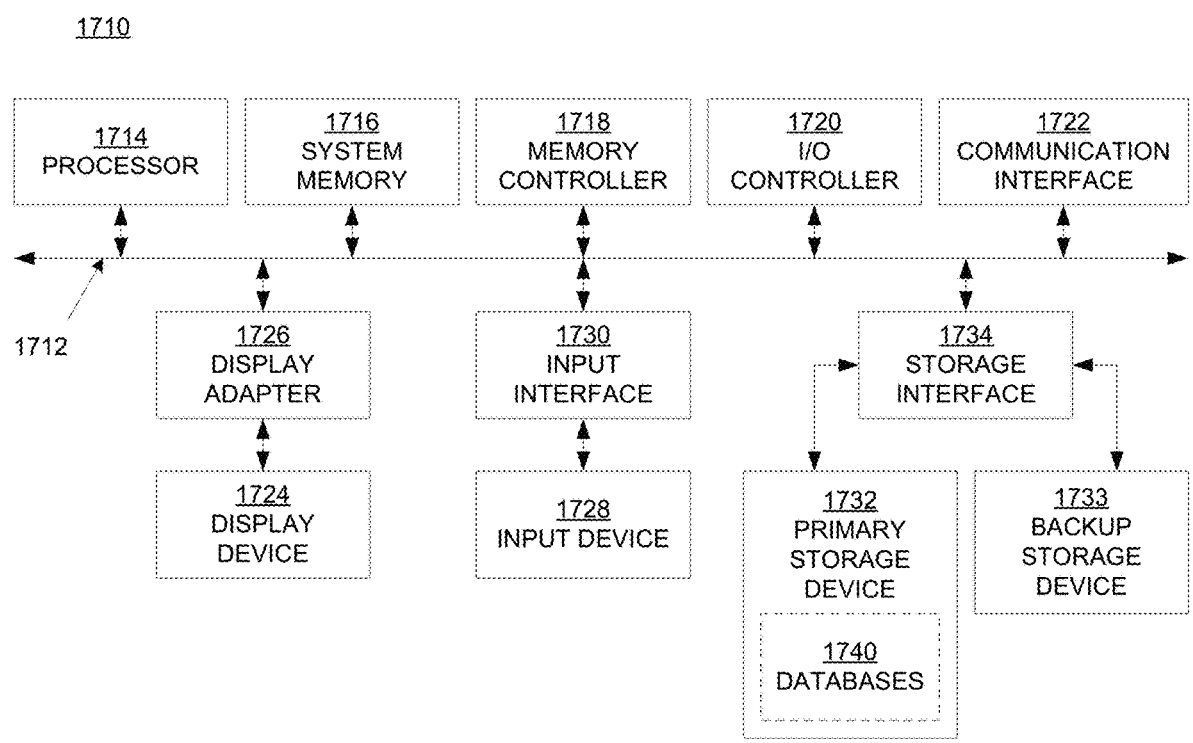
FIG. 17 is a block diagram of an example of a computing system capable of implementing embodiments of the present disclosure.

FIG. 17 is a block diagram of an example of a computing system 1710 capable of implementing embodiments of the present disclosure. Computing system 1710 broadly represents any single or multi-processor computing device or system capable of executing computer-readable instructions. Examples of computing system 1710 include, without limitation, workstations, laptops, client-side terminals, servers, distributed computing systems, handheld devices, or any other computing system or device. In its most basic configuration, computing system 1710 may include at least one processor 1714 and a system memory 1716.

Processor 1714 generally represents any type or form of processing unit capable of processing data or interpreting and executing instructions. In certain embodiments, processor 1714 may receive instructions from a software application or module. These instructions may cause processor 1714 to perform the functions of one or more of the example embodiments described and/or illustrated herein. For example, processor 1714 may perform and/or be a means for performing, either alone or in combination with other elements, one or more of the identifying, determining, using, implementing, translating, tracking, receiving, moving, and providing described herein. Processor 1714 may also perform and/or be a means for performing any other steps, methods, or processes described and/or illustrated herein.

System memory 1716 generally represents any type or form of volatile or non-volatile storage device or medium capable of storing data and/or other computer-readable instructions. Examples of system memory 1716 include, without limitation, RAM, ROM, FLASH memory, or any other suitable memory device. Although not required, in certain embodiments computing system 1710 may include both a volatile memory unit (such as, for example, system memory 1716) and a non-volatile storage device (such as, for example, primary storage device 1732.

Computing system 1710 may also include one or more components or elements in addition to processor 1714 and system memory 1716. For example, in the embodiment of FIG. 17, computing system 1710 includes a memory controller 1718, an I/O controller 1720, and a communication interface 1722, each of which may be interconnected via a communication infrastructure 1712. Communication infrastructure 1712 generally represents any type or form of infrastructure capable of facilitating communication between one or more components of a computing device. Examples of communication infrastructure 1712 include, without limitation, a communication bus (such as an IISA, PCI, PCIe, or similar bus) and a network. In one embodiment, system memory 1716 communicates via a dedicated memory bus.

Memory controller 1718 generally represents any type or form of device capable of handling memory or data or controlling communication between one or more components of computing system 1710. For example, memory controller 1718 may control communication between processor 1714, system memory 1716, and I/O controller 1720 via communication infrastructure 1712. Memory controller may perform and/or be a means for performing, either alone or in combination with other elements, one or more of the operations or features described herein.

I/O controller 1720 generally represents any type or form of module capable of coordinating and/or controlling the input and output functions of a computing device. For example, I/O controller 1720 may control or facilitate transfer of data between one or more elements of computing system 1710, such as processor 1714, system memory 1716, communication interface 1722, display adapter 1726, input interface 1730, and storage interface 1734. I/O controller 1720 may be used, for example, to perform and/or be a means for performing, either alone or in combination with other elements, one or more of the operations described herein. I/O controller 1720 may also be used to perform and/or be a means for performing other operations and features set forth in the instant disclosure.

Communication interface 1722 broadly represents any type or form of communication device or adapter capable of facilitating communication between example computing system 1710 and one or more additional devices. For example, communication interface 1722 may facilitate communication between computing system 1710 and a private or public network including additional computing systems. Examples of communication interface 1722 include, without limitation, a wired network interface (such as a network interface card), a wireless network interface (such as a wireless network interface card), a modem, and any other suitable interface. In one embodiment, communication interface 1722 provides a direct connection to a remote server via a direct link to a network, such as the Internet. Communication interface 1722 may also indirectly provide such a connection through, for example, a local area network (such as an Ethernet network), a personal area network, a telephone or cable network, a cellular telephone connection, a satellite data connection, or any other suitable connection.

Communication interface 1722 may also represent a host adapter configured to facilitate communication between computing system 1710 and one or more additional network or storage devices via an external bus or communications channel. Examples of host adapters include, without limitation, SCSI host adapters, USB host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 1722 may also allow computing system 1710 to engage in distributed or remote computing. For example, communication interface 1722 may receive instructions from a remote device or send instructions to a remote device for execution. Communication interface 1722 may perform and/or be a means for performing, either alone or in combination with other elements, one or more of the operations disclosed herein. Communication interface 1722 may also be used to perform and/or be a means for performing other operations and features set forth in the instant disclosure.

As illustrated in FIG. 17, computing system 1710 may also include at least one display device 1724 coupled to communication infrastructure 1712 via a display adapter 1726. Display device 1724 generally represents any type or form of device capable of visually displaying information forwarded by display adapter 1726. Similarly, display adapter 1726 generally represents any type or form of device configured to forward graphics, text, and other data from communication infrastructure 1712 (or from a frame buffer, as known in the art) for display on display device 1724.

As illustrated in FIG. 17, computing system 1710 may also include at least one input device 1728 coupled to communication infrastructure 1712 via an input interface 1730. Input device 1728 generally represents any type or form of input device capable of providing input, either computer- or human-generated, to computing system 1710. Examples of input device 1728 include, without limitation, a keyboard, a pointing device, a speech recognition device, or any other input device. In one embodiment, input device 1728 may perform and/or be a means for performing, either alone or in combination with other elements, one or more of the operations disclosed herein. Input device 1728 may also be used to perform and/or be a means for performing other operations and features set forth in the instant disclosure.

As illustrated in FIG. 17, computing system 1710 may also include a primary storage device 1732 and a backup storage device 1733 coupled to communication infrastructure 1712 via a storage interface 1734. Storage devices 1732 and 1733 generally represent any type or form of storage device or medium capable of storing data and/or other computer-readable instructions. For example, storage devices 1732 and 1733 may be a magnetic disk drive (e.g., a so-called hard drive), a floppy disk drive, a magnetic tape drive, an optical disk drive, a FLASH drive, or the like. Storage interface 1734 generally represents any type or form of interface or device for transferring data between storage devices 1732 and 1733 and other components of computing system 1710.

In one example, databases 1740 may be stored in primary storage device 1732. Databases 1740 may represent portions of a single database or computing device or a plurality of databases or computing devices. For example, databases 1740 may represent (be stored on) a portion of computing system 1710 and/or portions of example network architecture 1800 in FIG. 18 (below). Alternatively, databases 1740 may represent (be stored on) one or more physically separate devices capable of being accessed by a computing device, such as computing system 1710 and/or portions of network architecture 1800.

Continuing with reference to FIG. 17, storage devices 1732 and 1733 may be configured to read from and/or write to a removable storage unit configured to store computer software, data, or other computer-readable information. Examples of suitable removable storage units include, without limitation, a floppy disk, a magnetic tape, an optical disk, a FLASH memory device, or the like. Storage devices 1732 and 1733 may also include other similar structures or devices for allowing computer software, data, or other computer-readable instructions to be loaded into computing system 1710. For example, storage devices 1732 and 1733 may be configured to read and write software, data, or other computer-readable information. Storage devices 1732 and 1733 may also be a part of computing system 1710 or may be separate devices accessed through other interface systems.

Storage devices 1732 and 1733 may be used to perform, and/or be a means for performing, either alone or in combination with other elements, one or more of the operations disclosed herein. Storage devices 1732 and 1733 may also be used to perform, and/or be a means for performing, other operations and features set forth in the instant disclosure.

Many other devices or subsystems may be connected to computing system 1710. Conversely, all of the components and devices illustrated in FIG. 17 need not be present to practice the embodiments described herein. The devices and subsystems referenced above may also be interconnected in different ways from that shown in FIG. 17. Computing system 1710 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 1710. All or a portion of the computer program stored on the computer-readable medium may then be stored in system memory 1716 and/or various portions of storage devices 1732 and 1733. When executed by processor 1714, a computer program loaded into computing system 1710 may cause processor 1714 to perform and/or be a means for performing the functions of the example embodiments described and/or illustrated herein. Additionally or alternatively, the example embodiments described and/or illustrated herein may be implemented in firmware and/or hardware. For example, computing system 1710 may be configured as an ASIC adapted to implement one or more of the embodiments disclosed herein.

Figure 18:
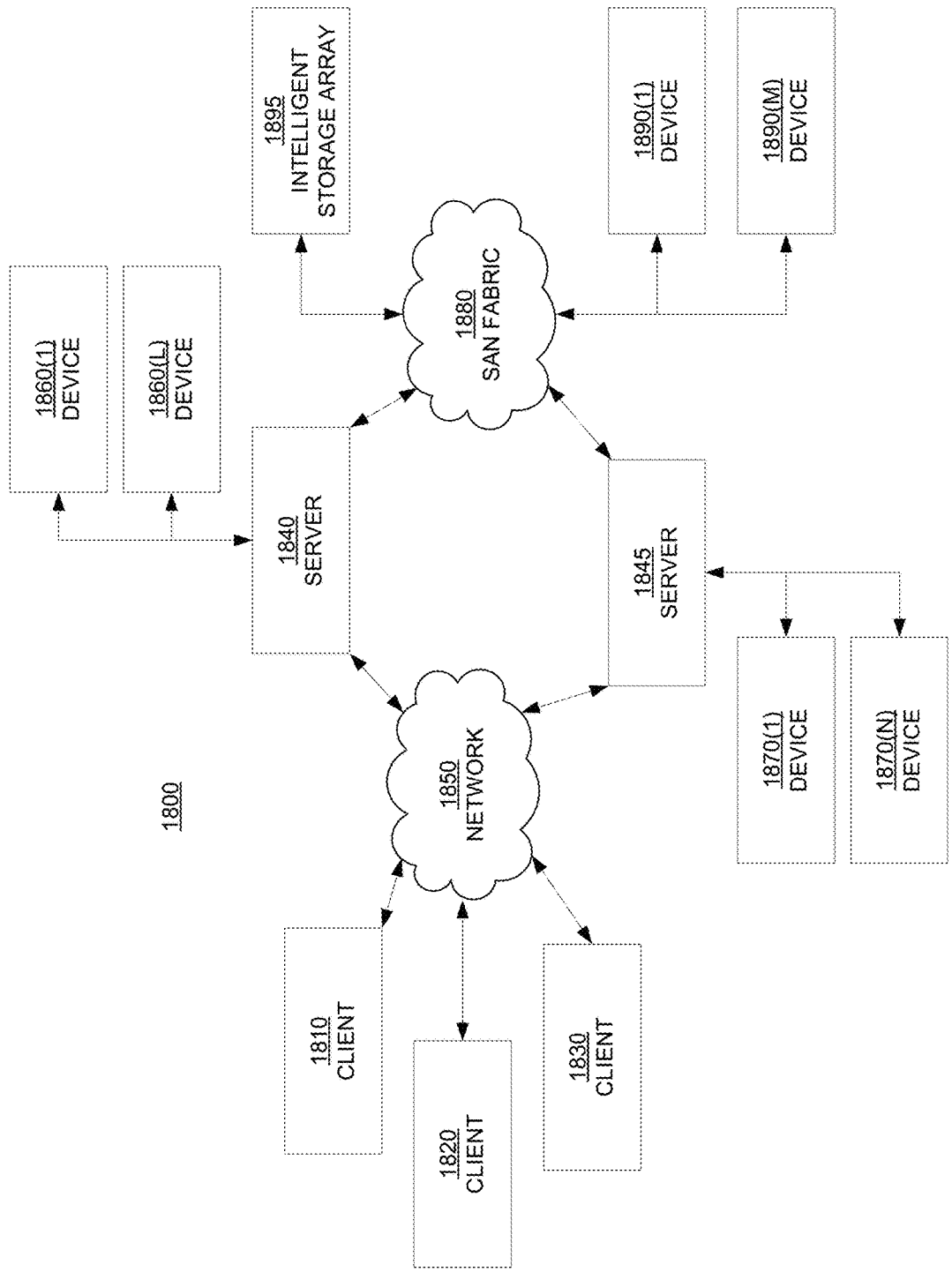
FIG. 18 is a block diagram of an example of a network architecture capable of implementing embodiments of the present disclosure.

FIG. 18 is a block diagram of an example of a network architecture 1800 in which client systems 1810, 1820, and 1830 and servers 1840 and 1845 may be coupled to a network 1850. Client systems 1810, 1820, and 1830 generally represent any type or form of computing device or system, such as computing system 1710 of FIG. 17.

Similarly, servers 1840 and 1845 generally represent computing devices or systems, such as application servers or database servers, configured to provide various database services and/or run certain software applications. Network 1850 generally represents any telecommunication or computer network including, for example, an intranet, a WAN, a LAN, a PAN, or the Internet.

As illustrated in FIG. 18, one or more storage devices 1860(1)-(L) may be directly attached to server 1840. Similarly, one or more storage devices 1870(1)-(N) may be directly attached to server 1845. Storage devices 1860(1)-(L) and storage devices 1870(1)-(N) generally represent any type or form of storage device or medium capable of storing data and/or other computer-readable instructions. Storage devices 1860(1)-(L) and storage devices 1870(1)-(N) may represent NAS devices configured to communicate with servers 1840 and 1845 using various protocols, such as NFS, SMB, or CIFS.

Servers 1840 and 1845 may also be connected to a SAN fabric 1880. SAN fabric 1880 generally represents any type or form of computer network or architecture capable of facilitating communication between storage devices. SAN fabric 1880 may facilitate communication between servers 1840 and 1845 and storage devices 1890(1)-(M) and/or an intelligent storage array 1895. SAN fabric 1880 may also facilitate, via network 1850 and servers 1840 and 1845, communication between client systems 1810, 1820, and 1830 and storage devices 1890(1)-(M) and/or intelligent storage array 1895 in such a manner that devices 1890(1)-(M) and array 1895 appear as locally attached devices to client systems 1810, 1820, and 1830. As with storage devices 1860(1)-(L) and storage devices 1870(1)-(N), storage devices 1890(1)-(M) and intelligent storage array 1895 generally represent any type or form of storage device or medium capable of storing data and/or other computer-readable instructions.

With reference to computing system 1710 of FIG. 17, a communication interface, such as communication interface 1722, may be used to provide connectivity between each client system 1810, 1820, and 1830 and network 1850. Client systems 1810, 1820, and 1830 may be able to access information on server 1840 or 1845 using, for example, a Web browser or other client software. Such software may allow client systems 1810, 1820, and 1830 to access data hosted by server 1840, server 1845, storage devices 1860(1)-(L), storage devices 1870(1)-(N), storage devices 1890(1)-(M), or intelligent storage array 1895. Although FIG. 18 depicts the use of a network (such as the Internet) for exchanging data, the embodiments described herein are not limited to the Internet or any particular network-based environment.

Returning to FIG. 18, in one embodiment, all or a portion of one or more of the example embodiments disclosed herein are encoded as a computer program and loaded onto and executed by server 1840, server 1845, storage devices 1860(1)-(L), storage devices 1870(1)-(N), storage devices 1890(1)-(M), intelligent storage array 1895, or any combination thereof. All or a portion of one or more of the example embodiments disclosed herein may also be encoded as a computer program, stored in server 1840, run by server 1845, and distributed to client systems 1810, 1820, and 1830 over network 1850. Accordingly, network architecture 1800 may perform and/or be a means for performing, either alone or in combination with other elements, one or more of the operations disclosed herein. Network architecture 1800 may also be used to perform and/or be a means for performing other operations and features set forth in the instant disclosure.

The above described embodiments may be used, in whole or in part, in systems that process large amounts of data and/or have tight latency constraints, and, in particular, with systems using one or more of the following protocols and formats: Key-Value (KV) Store, Memcached, Redis, Neo4J (Graph), Fast Block Storage, Swap Device, and Network RAMDisk. In addition, the above described embodiments may be used, in whole or in part, in systems employing virtualization, Virtual Desktop Infrastructure (VDI), distributed storage and distributed processing (e.g., Apache Hadoop), data analytics cluster computing (e.g., Apache Spark), Infrastructure as a Service (IaaS), Platform as a Service (PaaS), and other cloud computing platforms (e.g., Vmware vCloud, Open Stack, and Microsoft Azure). Further, the above described embodiments may be used, in whole or in party, in systems conducting various types of computing, including Scale Out, Disaggregation, Multi-Thread/Distributed Processing, RackScale, Data Center Scale Computing, Elastic Memory Provisioning, Memory as a Service, page migration and caching and Application Offloading/Acceleration and Integration, using various types of storage, such as Non-Volatile Memory Express, Flash, Multi-Tenancy, Internet Small Computer System Interface (iSCSI), Object Storage, Scale Out storage, and using various types of networking, such as 10/40/100 GbE, Software-Defined Networking, Silicon Photonics, Rack TOR Networks, and Low-Latency networking While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A method comprising:
   receiving, by a memory appliance, a memory related command of a client system, said memory related command being an application layer command, wherein said memory appliance comprises a host system, a memory controller, and a plurality of memory devices coupled to said memory controller;
   translating, by said memory appliance, said application layer command into a plurality of primitive commands that are lower layer commands than the application layer command and formatted to be executed by said memory controller to perform data manipulation operations on data of said plurality of memory devices stored in data structures;
   executing, by said memory controller, said plurality of primitive commands on said data to produce a result;
   establishing a direct memory transfer between said memory controller and a network interface of said memory appliance; and
   transferring, by said memory controller without transmitting said result to a processor of the host system, said result to said client system, wherein said memory related command is received over said network interface and said result is transferred over said network interface to said client system, wherein said memory related command of said client system is received over said network interface of said memory appliance and comprises an OSI layer 7 command.

2. The method as described in claim 1, wherein said establishing a direct memory transfer comprises:
   establishing a direct memory access (DMA) memory transfer.

3. The method as described in claim 1, wherein said memory controller comprises a programmable logic device.

4. The method as described in claim 3, wherein said programmable logic device comprises a field programmable gate array (FPGA) device.

5. The method as described in claim 4, wherein said plurality of primitive commands are accelerated via execution on said FPGA device.

6. The method as described in claim 1, wherein said receiving said memory related command comprises receiving said memory related command using a communication protocol that is substantially compliant with a peripheral component interconnect express (PCIE) communication bus protocol.

7. The method as described in claim 1, further comprising:
   storing said plurality of primitive commands as a command chain, wherein said command chain comprises a program operable for re-execution in response to another memory related command of said client system, said another memory related command providing said program with new parameters for said re-execution thereof.

8. The method of claim 1, wherein said data structures comprise a key-value store memory.

9. The method of claim 1, wherein said memory related command of said client system comprises an application specific operation generated by an application of said client system.

10. The method of claim 1, wherein said application layer command comprising at least one of a data sort command or a data compression command.

11. The method of claim 1, wherein said memory related command of said client system comprises a memcached operation.

12. The method of claim 1, wherein said application layer command comprising at least one of a get command, a set command, or a delete command.

13. The method of claim 1, wherein said network interface of said memory appliance comprises at least one of a network interface card (NIC) or a network processing unit (NPU) with access to a network and said network is external to said memory appliance.

14. The method of claim 1, wherein said host system comprises system memory and wherein transferring said result comprises transferring said result to said client system without copying said result to said system memory of said host system.

15. The method of claim 14, wherein said client system comprises at least one of a laptop or a handheld device and wherein said host system comprises a server coupled to said plurality of memory devices.

16. The method of claim 1, wherein said memory related command comprises a single memory related command of the client system and wherein translating said memory related command comprises translating said single memory related command into said plurality of primitive commands that are memory related commands.

17. A method comprising:
receiving, by a memory appliance, a memory related command of a client system, said memory related command being an application layer command, wherein said memory appliance comprises a host system, a memory controller, and a plurality of memory devices coupled to said memory controller;
translating, by said memory appliance, said memory related command into a plurality of commands that are formatted to be executed by said memory controller to perform data manipulation operations on data of said plurality of memory devices stored in data structures;
executing, by said memory controller, said plurality of commands on said data to produce a result;
establishing a direct memory transfer between said memory controller and a network interface of said memory appliance; and
transferring, by said memory controller without transmitting said result to a processor of the host system, said result to said client system, wherein said memory related command is received over said network interface and comprises an OSI layer 7 command, and said result is transferred over said network interface to said client system, wherein said transferring said result further comprises:
storing in a buffer at least one pointer to data in said plurality of memory devices that satisfy said memory related command;
accessing said pointer in said buffer by said network interface;
accessing said data using said pointer; and
returning said data to said network interface for delivery over a network.

18. A method comprising:
receiving, by a memory appliance over a network interface, a memory related command of a client system said memory related command being an application layer command, wherein said memory appliance comprises a host system, a memory controller, and a plurality of memory devices;
translating, by said memory appliance, said application layer command into a plurality of commands more primitive than said memory related command;
storing said plurality of commands in a first queue;
reading, by said memory controller, said plurality of commands from said first queue;
executing, by said memory controller, said plurality of commands on data stored in said plurality of memory devices to produce a result;
establishing a direct memory transfer, without using a processor of the host system, between said memory controller and said network interface to transfer said result to said client system which sent said memory related command, wherein said memory related command is received over said network interface and comprises an OSI layer 7 command, and said result is transferred over said network interface to said client system; and
notifying said host system of said transfer.

19. The method of claim 18, wherein establishing a direct memory transfer comprises establishing a direct memory access (DMA) memory transfer.

20. The method as described in claim 19, wherein said establishing a direct memory transfer is initiated by the processor of said host system.

21. A memory appliance comprising:
a network interface operable to receive a memory related command of a client system, said memory related command being an application layer command;
a host system comprising a processor operable to interface with said network interface to receive and translate said memory related command into a plurality of primitive commands that are lower layer command than the application layer command and are formatted to be executed by a memory controller;
a plurality of memory devices comprising data in one or more data structures; and
the memory controller coupled to said plurality of memory devices, wherein said plurality of primitive commands comprise data manipulation operations of data stored in at least one data structure;
wherein the processor is operable to establish a direct memory transfer between said memory controller and the network interface;
wherein said memory controller is operable to execute said plurality of primitive commands on said data to produce a result and to transfer, without transmitting said result to the processor of the host system, said result to said client system; and
wherein said memory related command is received over said network interface and comprises an OSI layer 7 command, and said result is transferred over said network interface to said client system.

22. The memory appliance of claim 21, further comprising a plurality of memory units, wherein a memory unit of said plurality of memory units comprises said memory controller and said plurality of memory devices.

23. The memory appliance of claim 21, wherein said memory controller comprises a programmable logic device.

24. The memory appliance of claim 21, wherein said memory controller comprises an application specific integrated circuit (ASIC).

* * * * *